United States Patent
Rusnak et al.

(10) Patent No.: US 11,328,245 B1
(45) Date of Patent: May 10, 2022

(54) SYSTEMS FOR IMPROVED DELIVERY OF TIME-CRITICAL GOODS

(71) Applicant: Airspace Technologies, Inc., Carlsbad, CA (US)

(72) Inventors: Ryan Rusnak, Vista, CA (US); Neil Holt, Carlsbad, CA (US); Alex Cunanan Panganiban, Chula Vista, CA (US)

(73) Assignee: AIRSPACE TECHNOLOGIES, INC., Carlsbad, CA (US)

( * ) Notice: Subject to any disclaimer, the term of this patent is extended or adjusted under 35 U.S.C. 154(b) by 0 days.

(21) Appl. No.: 17/451,096

(22) Filed: Oct. 15, 2021

(51) Int. Cl.
*G06Q 30/00* (2012.01)
*G06Q 10/08* (2012.01)
*G06T 7/00* (2017.01)

(52) U.S. Cl.
CPC ......... *G06Q 10/083* (2013.01); *G06Q 10/087* (2013.01); *G06T 7/001* (2013.01); *G06T 2207/30204* (2013.01)

(58) Field of Classification Search
CPC .... G06Q 10/083; G06Q 10/087; G06T 7/001; G06T 2207/30204
USPC ........................................................ 705/330
See application file for complete search history.

(56) References Cited

U.S. PATENT DOCUMENTS

| | | | | |
|---|---|---|---|---|
| 10,936,992 B1* | 3/2021 | Rusnak | ............... | G06Q 10/0834 |
| 2002/0092903 A1* | 7/2002 | Matsumoto | ........ | G06Q 30/0635 |
| | | | | 235/375 |
| 2004/0230439 A1* | 11/2004 | Aptekar | ................ | G06Q 10/08 |
| | | | | 705/330 |
| 2014/0122889 A1* | 5/2014 | Freund | .................... | G01S 19/14 |
| | | | | 713/176 |
| 2021/0191827 A1* | 6/2021 | Arumugam | ......... | G06F 11/2025 |

* cited by examiner

*Primary Examiner* — Charlotte M Baker
(74) *Attorney, Agent, or Firm* — Sterne, Kessler, Goldstein & Fox P.L.L.C.

(57) ABSTRACT

Some embodiments are directed to a computer implemented method for transporting a good. The method may comprise receiving, on a first client device, an electronic user request for transporting the good from a pickup location to a destination location. The electronic user request may include a unique identifier corresponding to the good. The method may include assigning the electronic user request to a transport provider. The method may include authenticating the good, rejecting the good, and authorizing the good for transport when the good is authenticated. The transport provider may capture an image of the good. Authenticating the good may include scanning the captured image to identify features, comparing the unique identifiers to the identified features, and authenticating the good when the unique identifier matches the identified features. The good may be rejected if there is not a match between the unique identifier and the identified goods.

26 Claims, 29 Drawing Sheets

FIG. 4

Package Information
Will you be printing and applying the Airspace label for a more seamless delivery experience?
(Airspace Label) (Other Label) ←— 421

Commodity
[Frozen/Refrigerated | ∨] ←— 422

Unique Piece ID Type
Patient Name

Unique Piece ID
[　　　　　] +
Required
↑
425

Dimensions (LxWxH)    Unit
[3 ⊖ X 2 ⊖ X 3 ⊖] [IN | ∨]

Weight
[3 ⊖]
Unit
[LBS | ∨]
} 424

} 423

Total: 1 piece    427

426 —→ [+ ADD PIECE]

⊙ Dangerous Goods
Does this shipment contain dangerous goods/hazardous material? View Dangerous Goods Definition⊡
○ Yes  ○ No

Upload Documents (Optional)

SYSTEMS FOR IMPROVED DELIVERY OF TIME-CRITICAL GOODS

BACKGROUND

The present disclosure relates to systems and methods for transporting a good from a pickup location to a destination location. More specifically, the present disclosure relates to delivery of time-critical goods, including authenticating those goods and authorizing the goods for transporting based on one or more unique identifiers.

BRIEF SUMMARY

Some embodiments are directed to a computer implemented method for transporting of a good, comprising receiving, on a first client device, an electronic user request for transporting the good from a pickup location to a destination location, the electronic user request being generated by a first user and comprising a unique identifier corresponding to the good, the unique identifier comprising a number sequence, an alphanumeric sequence, a barcode, or a QR code; assigning the user request to a remote user of a second client device, the second client device comprising a digital camera configured to capture one or more images of the good, the assigning comprising transmitting the user request to the second client device; receiving, on the first client device, an electronic image of the good captured by the digital camera of the second client device; authenticating the good, the authentication comprising performing a scan of the electronic image to identify features of the good; comparing the unique identifier to the identified features of the good; authenticating the good when the unique identifier matches a first feature of the identified features of the good; authorizing the good for transporting when the good is authenticated; and rejecting the good for transporting when the good is not authenticated.

In any of the various embodiments discussed herein, the authorizing the good comprises sending an electronic transmission indicating approval of the image, and the rejecting the good comprises sending an electronic transmission indicating rejection of the image comprises an error notification.

In any of the various embodiments discussed herein, the method further comprises encrypting the user request before transmitting the user request to the second client device.

In any of the various embodiments discussed herein, the user request comprises a second unique identifier.

In any of the various embodiments discussed herein, the authenticating the good further comprises comparing the second unique identifier to the identified features of the good; and authenticating the good when the second unique identifier matches a second feature of the identified features of the good, the second feature being different than the first feature.

In any of the various embodiments discussed herein, the second unique identifier comprises one or more of a number sequence, an alphanumeric sequence, a word, a barcode, a QR code, an address, a name, a UNOS number, or a description of the good, and wherein the second unique identifier is different than the unique identifier.

In any of the various embodiments discussed herein, the second unique identifier comprises one or more of a UNOS number or a name.

In any of the various embodiments discussed herein, the user request comprises the pickup location and the destination location.

In any of the various embodiments discussed herein, the authorizing the good further comprises transmitting an approval notification to the remote user when the good is authenticated.

In any of the various embodiments discussed herein, the rejecting the good further comprises transmitting an error notification to the remote user when the good is not authorized.

In any of the various embodiments discussed herein, the error notification comprises a phone call, an SMS message, an email, or a push notification.

In any of the various embodiments discussed herein, the error notification comprises a message to the remote user to capture a replacement electronic image of the unique identifier on the second client device.

In any of the various embodiments discussed herein, the method further comprises receiving, on the first client device, the replacement electronic image, and the authenticating the good further comprises performing a scan of the replacement electronic image to identify features of the good; comparing the unique identifier to the identified features of the good; authenticating the good when the unique identifier matches a first feature of the identified features of the good; authorizing the good for transporting when the good is authenticated; and rejecting the good for transporting when the good is not authenticated.

In any of the various embodiments discussed herein, the method further comprises receiving a second electronic image of the good.

In any of the various embodiments discussed herein, the authorizing the good comprises transmitting the destination location to the second client device.

In any of the various embodiments discussed herein, the method further comprises generating, on the first client device, a route from the pickup location and the destination location, and wherein the route comprises a first segment from the pickup location to a second location.

In any of the various embodiments discussed herein, the authorizing the good further comprises transmitting the second location to the second client device.

In any of the various embodiments discussed herein, the authenticating the good further comprises performing optical character recognition on the electronic image to detect text; and generating a comparison based on the detected text and the unique identifier.

In any of the various embodiments discussed herein, the authenticating the good is done on the first client device.

In any of the various embodiments discussed herein, the user request comprises N unique identifiers, wherein N is an integer greater than or equal to 1, and wherein the N unique identifiers includes the unique identifier, and wherein the authenticating the good further comprises: comparing each of the N unique identifiers to the identified features of the good; authenticating the good when the each of the N unique identifiers matches at least one feature of the identified features of the good; and rejecting the good when any one of the N unique identifiers does not match at least one feature of the identified features of the good.

Some embodiments are directed to a system comprising a first client device, the first client device configured to receive a user request for transporting of a good from a pickup location to a destination location, the user request comprising a unique identifier corresponding to the good; the pickup location; and the destination location; transmit the user request to a second client device of a remote user, the second client device comprising a digital camera; receive an electronic image of the good captured by the digital camera of the second client device; authenticate the good based on the electronic image, the authenticating comprises: performing a scan of the electronic image to identify features of the good; comparing the unique identifier to the identified features of the good; authenticating the good when the unique identifier matches a first feature of the identified features of the good; authorize the good for transporting when the good is authenticated; and reject the good for transporting when the good is not authenticated.

In any of the various embodiments discussed herein, the second client device is configured to provide directions from a current location of the second client device to the pickup location when the first client device transmits the user request to the second client device.

In any of the various embodiments discussed herein, the second client device is configured to provide directions from the pickup location to a second location when the first client device authorizes the good for transporting.

In any of the various embodiments discussed herein, the user request comprises a second unique identifier corresponding to the good.

In any of the various embodiments discussed herein, the authentication further comprises comparing the second unique identifier to the identified features of the good and authenticating the good when the second unique identifier matches a second feature of the identified features of the good.

In any of the various embodiments discussed herein, first client device is further configured to automatically contact the remote user when the good is rejected.

BRIEF DESCRIPTION OF THE FIGURES

FIGS. 4-8 are example user interfaces for a user creating an electronic user request for transporting a good.

FIG. 12 is an example user interface for showing a route of an electronic user request for transporting the good.

FIG. 13 is an example user interface showing assigning the electronic user request shown in FIG. 12 to a transport provider.

FIGS. 24-27 are example user interfaces for authenticating the good.

DETAILED DESCRIPTION

Figure 1:
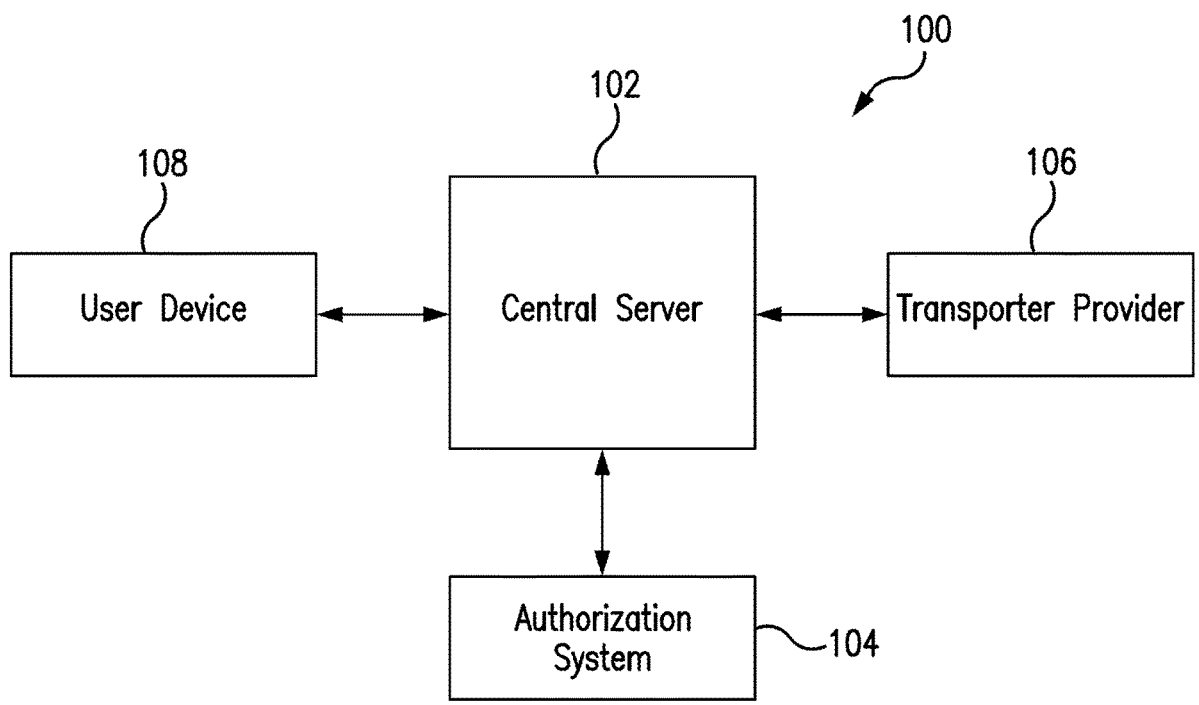
FIG. 1 is a block diagram of an example system according to some embodiments.

Goods are regularly transported from one location to another, and often these goods require transportation in a time sensitive manner and without error. For example, when an organ from an organ donor is transported to a recipient of that organ, the transportation must occur without error and within a specified timeframe. Any errors can have severe consequences, such as loss of viability of the organ. Aside from organ donation, there is a need for similar transportation of various goods without error and in a timely manner. For example, perishable foods or non-perishable goods that require expedited shipping may likewise benefit from a system that provide accurate and timely transportation of the good.

Existing systems are limited because a user is often restricted to using labels or packaging that are specific to the transport providers. And transport providers may receive only limited information about a good, which can result in a transport provider accidentally retrieving and transporting an incorrect good. This can result in undesirable delays if the transport provider must return to retrieve the correct good, or it can result in the incorrect good being delivered to the destination location. Moreover, a user of existing systems has limited options for providing unique identification of a good when requesting transportation. And existing systems do not provide systems for authenticating and authorizing a good for transport every time the good changes hands from one person to another or from one mode of transportation to another.

Although package carriers include tracking numbers, there exists a need for transportation options that allow for more robust identification, authentication, and authorization during the transportation of the good.

Embodiments described herein overcome these and other challenges by providing—among other benefits—time-critical and error-free transportation of a good. This time-critical and error-free transportation of a good may be initiated by an individual user and is not limited by the existing package carriers' tracking systems. Instead, systems and methods according to embodiments disclosed herein may be used instead of or in conjunction with existing package carriers' tracking systems. Moreover, embodiments described herein include methods for authenticating and authorizing the good for transport at every step of the transportation process.

The methods and systems according to some embodiments allow for optimized transportation of goods while also reducing errors associated with incorrect goods being picked up. For example, methods according to some embodiments allow for identification of a package using identifiers independent of or in conjunction with shipping labels from package carriers (e.g., FedEx, UPS, USPS, etc.). These unique identifiers may be provided by a user requesting transport, and the good may be authenticated and authorized for transport based on these unique identifiers. This reduces errors related to improper package pickup and reduces time spent identifying a good ready for transport.

System 100 may include central server 102 that communicates with two or more remote devices. For example, as illustrated in FIG. 1, system 100 may include central server 102 in communication with various devices, such as an authorization system 104 comprising one or more client devices, a transport provider system 106 comprising one or more client devices, and user device 108 comprising one or more client devices. In some embodiments, authorization system 104 comprises a first client device, transport provider system 106 comprises a second client device, and user device 108 comprises a third client device. In some embodiments, the authorization system 104 further comprises two client devices. First client device of authorization system 104 may be configured to receive an electronic user request generated by a user on third client device of user device 108. The electronic user request is described in more detail below. First client device of authorization system 104 may be configured to process the electronic user request and assign the electronic user request to a transport provider on second client device of transport provider 106. Second client device of transport provider 106 may include a digital camera for capturing images of goods for transport. First client device of authorization system 104 may be configured to receive images captured by second client device of transport provider 106. Further, first client device of authorization system 104 may be configured to authenticate and authorize a good for transport based on the images captured by a transport provider 106 (e.g., using a digital camera on second client device). In some embodiments, authorization system 104 includes another client device configured to authenticate and authorize the good for transport. In some embodiments, the data (e.g., electronic user request, images, messages, etc.) transmitted between the various devices and systems (e.g., user device, the authorization system, and the transport provider) may be encrypted before transmission and decrypted on the device that receives the data.

Figure 2:
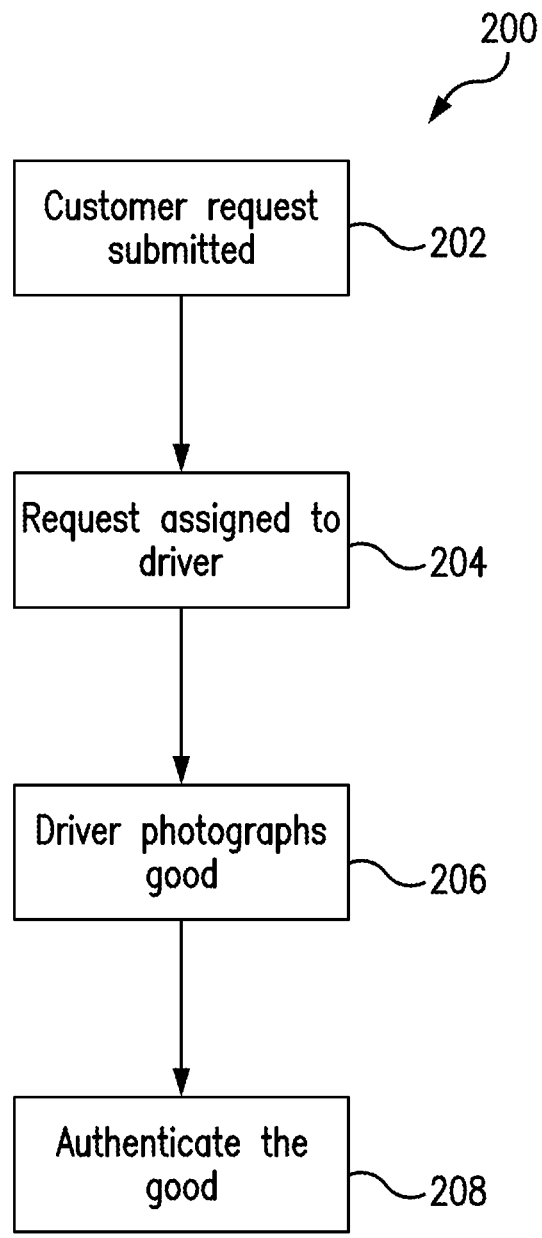
FIG. 2 is a flow chart of an example method according to some embodiments.

FIG. 2 illustrates an exemplary method 200 according to some embodiments. For example, in some embodiments, at step 202, a user may submit an electronic user request using user device 108. In some embodiments, authorization system 104 may receive the electronic user request and assign the electronic user request to a transport provider 106 at step 204. In some embodiments, at step 206, the transport provider 106 may capture images of the good using a digital camera and transmit those images to central server 102. In some embodiments, at step 208, authorization system 104 may receive the captured images and authenticate the good based on the captured images.

Figure 3:
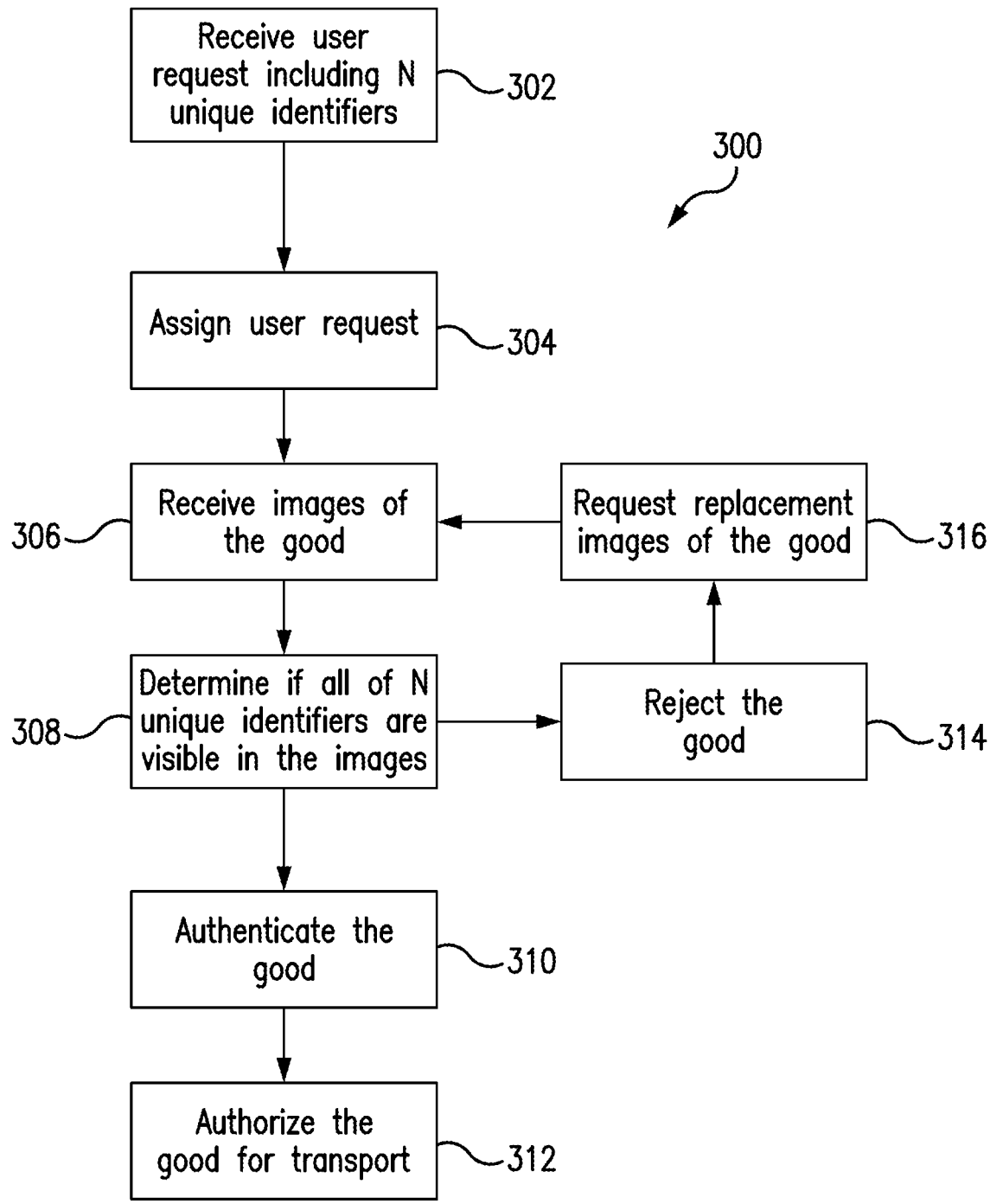
FIG. 3 is a flow chart of an example method of authenticating and authorizing a good for transport according to some embodiments.

FIG. 3 illustrates an exemplary method 300 according to some embodiments. Method 300 may be executed using system 100 illustrated in FIG. 1. In some embodiments, at step 302, the authorization system receives an electronic user request including a request to transport a good, and the electronic user request may include N unique identifiers, where N is an integer greater than or equal to 1. The unique identifiers are described in more detail below. In some embodiments, at step 304, the authorization system assigns the electronic user request to a transport provider 106. In some embodiments, at step 306, authorization system 104 receives images of the good for transport. In some embodiments, the images of the good are captured by a digital camera on a client device of transport provider 106.

The images may then be used to authenticate the good and authorize the good for transport. In some embodiments, the authorization system 104 authenticates the goods by comparing the images of the good to the N unique identifiers. If the authorization system determines that all of the N unique identifiers are present in the image, at step 310, the authorization system authenticates the good for transport. After authenticating the good for transport, at step 312, the authorization system 104 authorizes the good for transport. If the authorization system 104 determines that one or more of the N unique identifiers is missing from the image, at step 314, the authorization system may reject the good such that the transport provider 106 is not authorized to transport the good. If the authorization system 104 rejects the good, at step 316, the authorization system 104 may request that the transport provider capture replacement images of the good. The authorization system 104 may then receive the replacement images and repeat steps 306 and 308 and optionally 310, 312, 314, and 316 as needed based on the new images.

In some embodiments, the authorization system 104 includes one client device (e.g., a first client device) that performs all steps illustrated in method 300. The authorization system 104 may include two or more client devices. For example, in some embodiments, the authorization system 104 includes two client devices, a first client device and a request device (not illustrated in FIG. 1). In some embodiments, the request device performs steps 302 and 304 and first client device performs steps 306, 308, 310, and 312 and optionally steps 314 and 316 as needed.

After receiving the electronic user request on a transport provider 106 (e.g., on second client device), transport provider 106 may travel to a first location (e.g., pickup address 402) where a good is located. Once there, at step 206, the transport provider may capture images of the good and transmit those images to the authorization system for authentication and authorization as described in detail below.

Electronic User Request

A user may generate an electronic user request on second device (e.g., third client device of user device 108). FIGS. 4-10 illustrate an exemplary user interface 400 for a user to generate an electronic user request. User interface 400 may include pickup information and delivery information (e.g., pickup address 402, pickup address point of contact 404, pickup special instructions 406, delivery address 410, delivery address point of contact 412, delivery special instructions 414). User interface 400 may include package information 420 (e.g., label 421, good type 422, good dimensions 423, good weight 424, one or more unique identifiers 425, an add piece option 426, and a dangerous goods designation 427).

Figure 4:
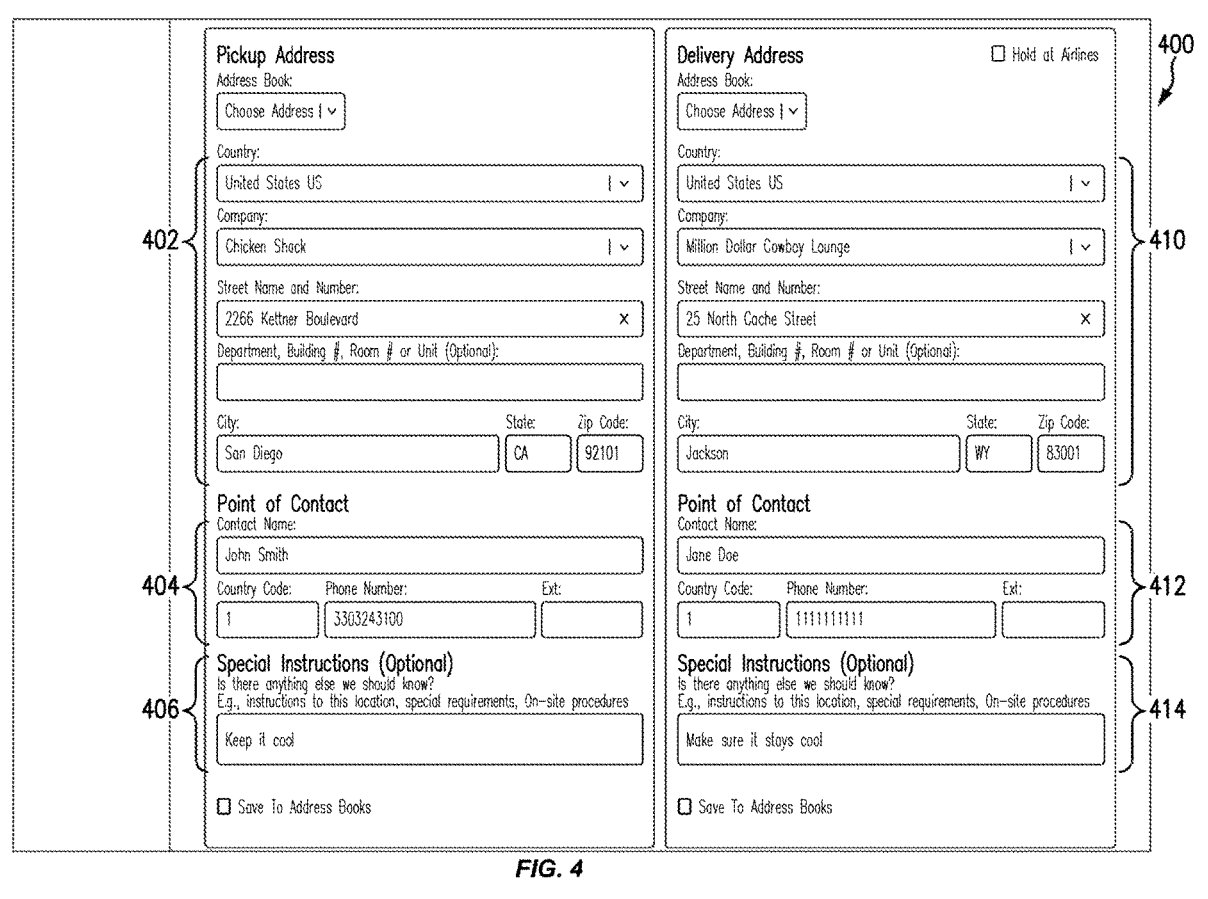

As illustrated in FIG. 4, the electronic user request may include pickup address 402, which is input by the user and includes details of the location where the good will be picked up. For example, pickup address 402 may include fields for one or more of country, company name, street name and number, city, state, zip code, department, building number, room number, and/or unit number. The electronic user request may also include a pickup address point of contact 404, including a contact name and phone number. The electronic user request may also include a field for special instructions 406. For example, the special instructions may be anything specifically required for the good (e.g., to maintain a certain temperature, keep the good oriented in a specific way, etc.).

As illustrated in FIG. 4, the electronic user request may include pickup address 402 that may include details of the location where the good will be picked up. For example, pickup address 402 may include fields for one or more of country, company name, street name and number, city, state, zip code, department, building number, room number, and/or unit number. The electronic user request may also include a pickup address point of contact 404, including a contact name and phone number. The electronic user request may also include a field for special instructions 406. For example, the special instructions may be anything specifically required for the good (e.g., to maintain a certain temperature, keep the good oriented in a specific way, etc.). Pickup address 402 may be input by the user, selected from an address book, or imported from a mapping software.

As illustrated in FIG. 4, the electronic user request may include delivery address 410 that may include details of the location where the good will be dropped off. For example, delivery address 410 may include fields for one or more of country, company name, street name and number, city, state, zip code, department, building number, room number, and/ or unit number. The electronic user request may also include a delivery address point of contact 412, including a contact name and phone number. The electronic user request may also include a field for special instructions 414. For example, the special instructions may be anything specifically required for the good (e.g., to maintain a certain temperature, keep the good oriented in a specific way, etc.). Delivery address 410 may be input by the user, selected from an address book, or imported from a mapping software.

Figure 6:
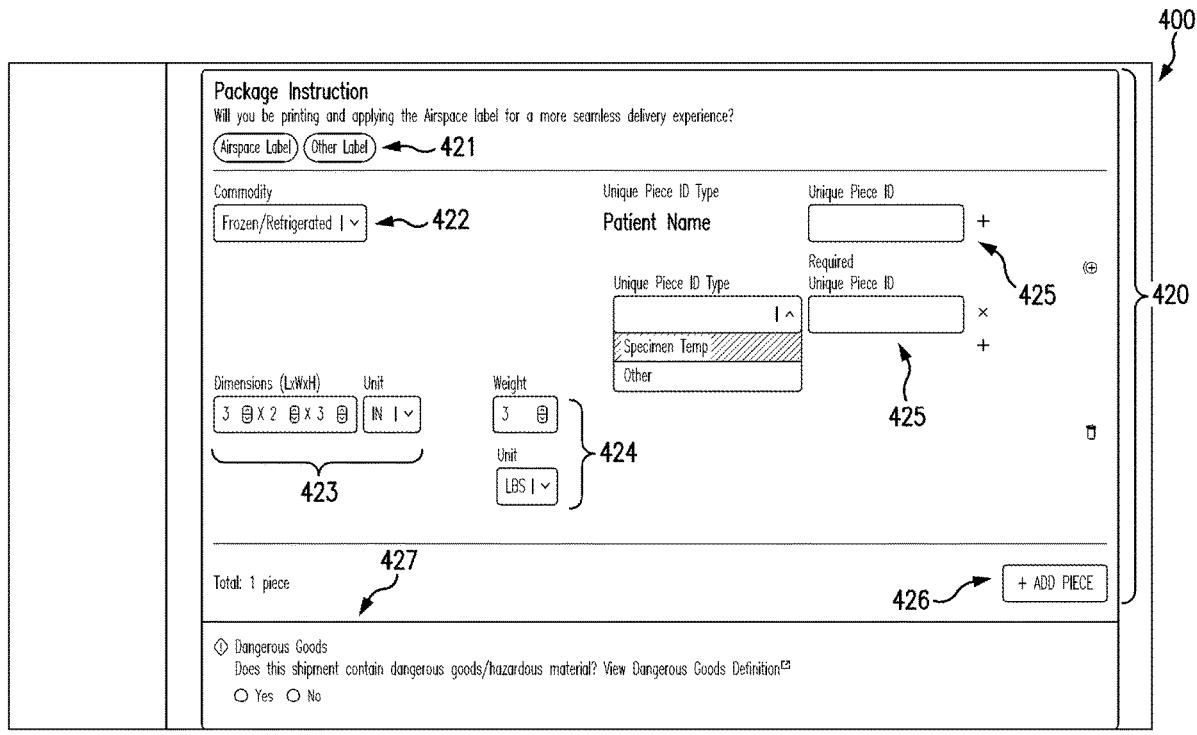
Figure 7:
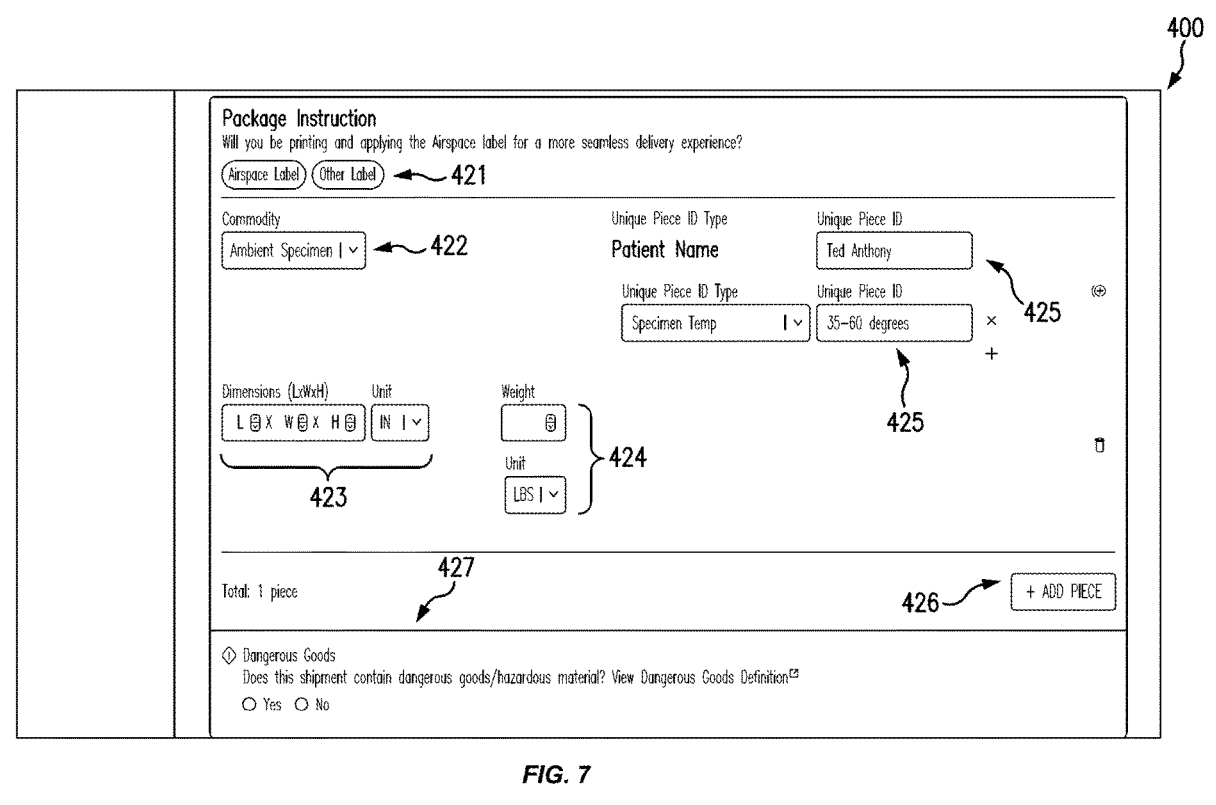

As illustrated in FIG. 5, the electronic user request may include package information 420 that may include information identifying the specific good. For example, the package information 420 may include a label 421. Any suitable label may be used, including a label generated by a shipping carrier (e.g., UPS, FedEx, etc.) or the U.S. Postal Service. Package information 420 may include good type 422 (e.g., frozen, refrigerated, ambient, medical device, organ, electronic device, perishable, etc.). Package information may include dimensions 423 of the good (e.g., length, width, and height measurements) and weight 424 of the good. Package information 420 may also include one or more unique identifiers 425. Each of the one or more unique identifiers 425 may include a description of the type of identifier (e.g., name, temperature, shipment number, tracking number, customer number, identification number, etc.) and the identifier itself. The one or more unique identifiers 425 may include one or more of the type of unique identifiers described below. FIGS. 6 and 7 illustrate a generating an electronic user request for a good with two unique identifiers 425.

Figure 8:
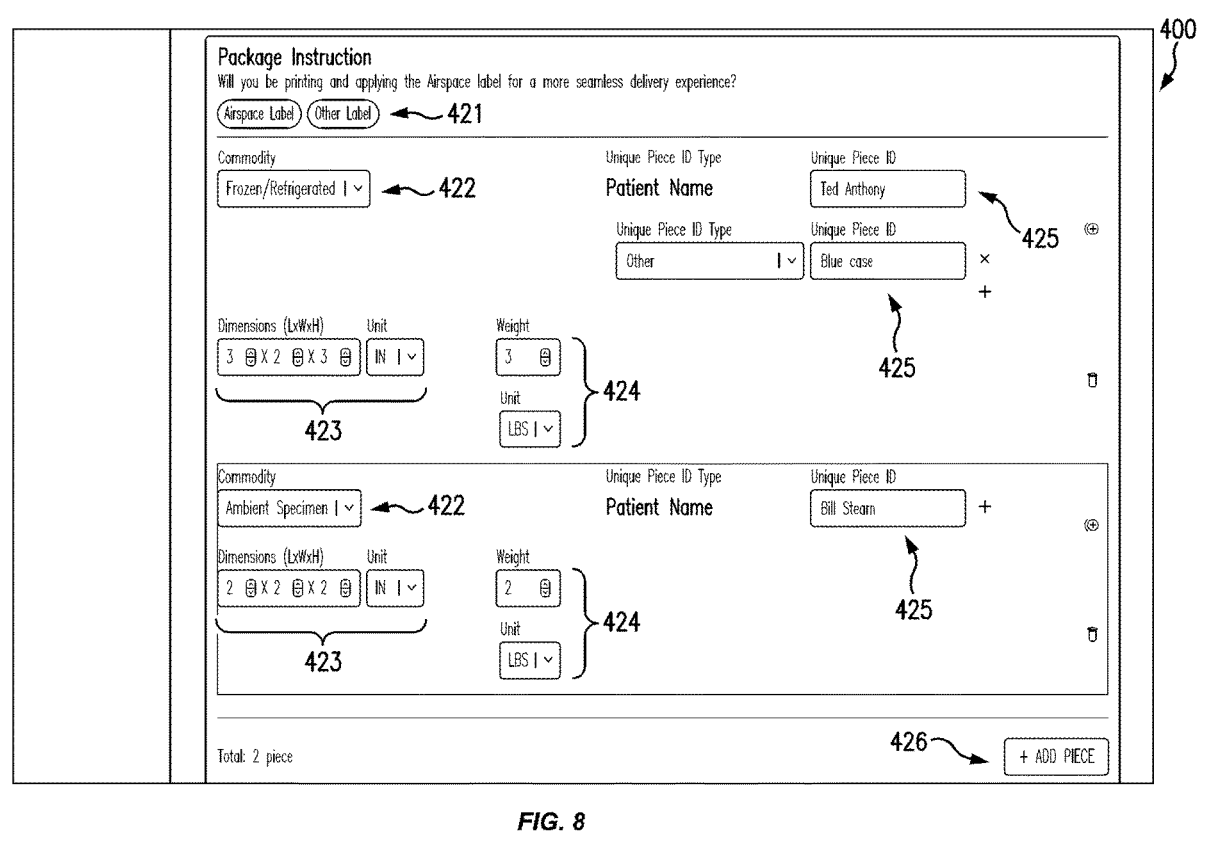

Each electronic user request may include more than one good, with one or more unique identifiers 425 corresponding to each good. For example, FIG. 8 illustrates an electronic user request with two goods, one with two unique identifiers 425 and one with one unique identifier 425.

Figure 9:
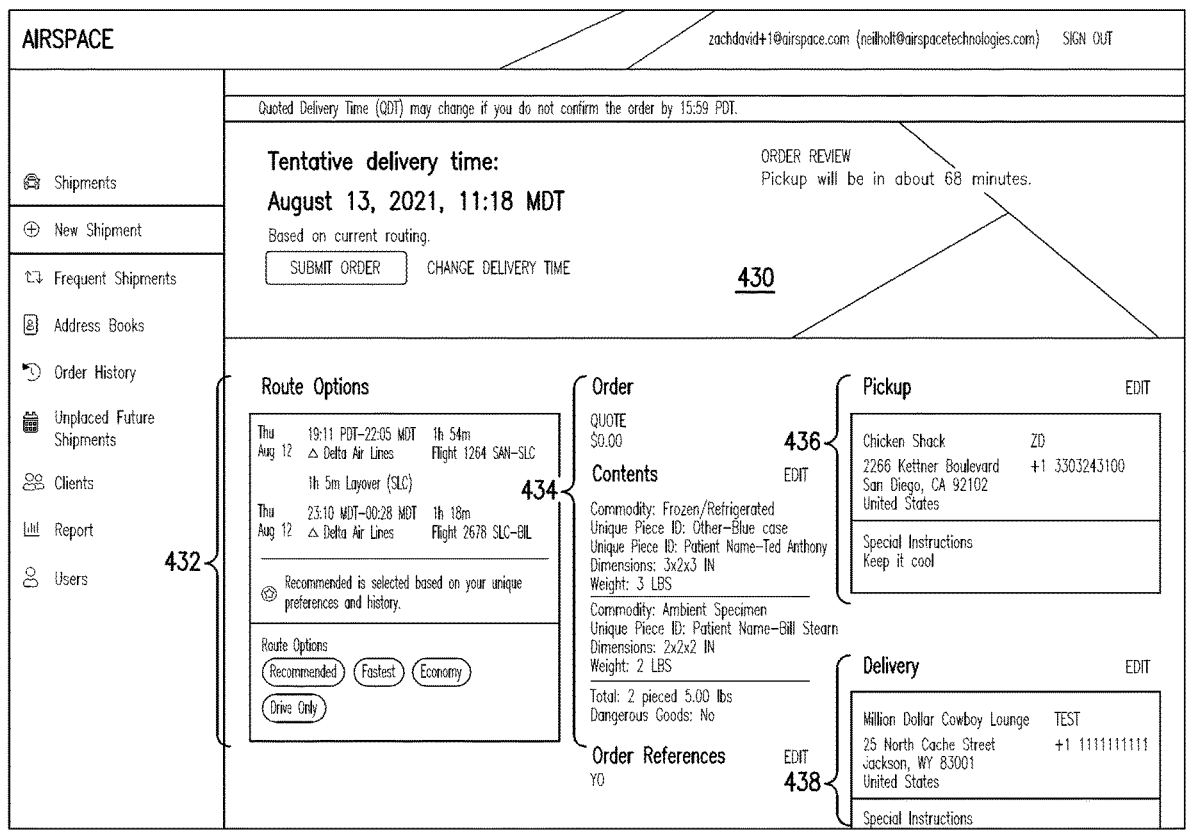
FIG. 9 is an example user interface for confirming an electronic user request for transporting a good before submitting the electronic user request.

FIG. 9 illustrates an exemplary user interface 400 showing route options 432, a summary of the goods 434, pickup summary 436, and delivery summary 438. Route options 432 may present alternate route options for transporting the good. The alternative route options may provide route options optimized speed (e.g., fastest route), cost (e.g., least expensive route), and/or transportation mode (e.g., ground, air, or train).

Figure 10:
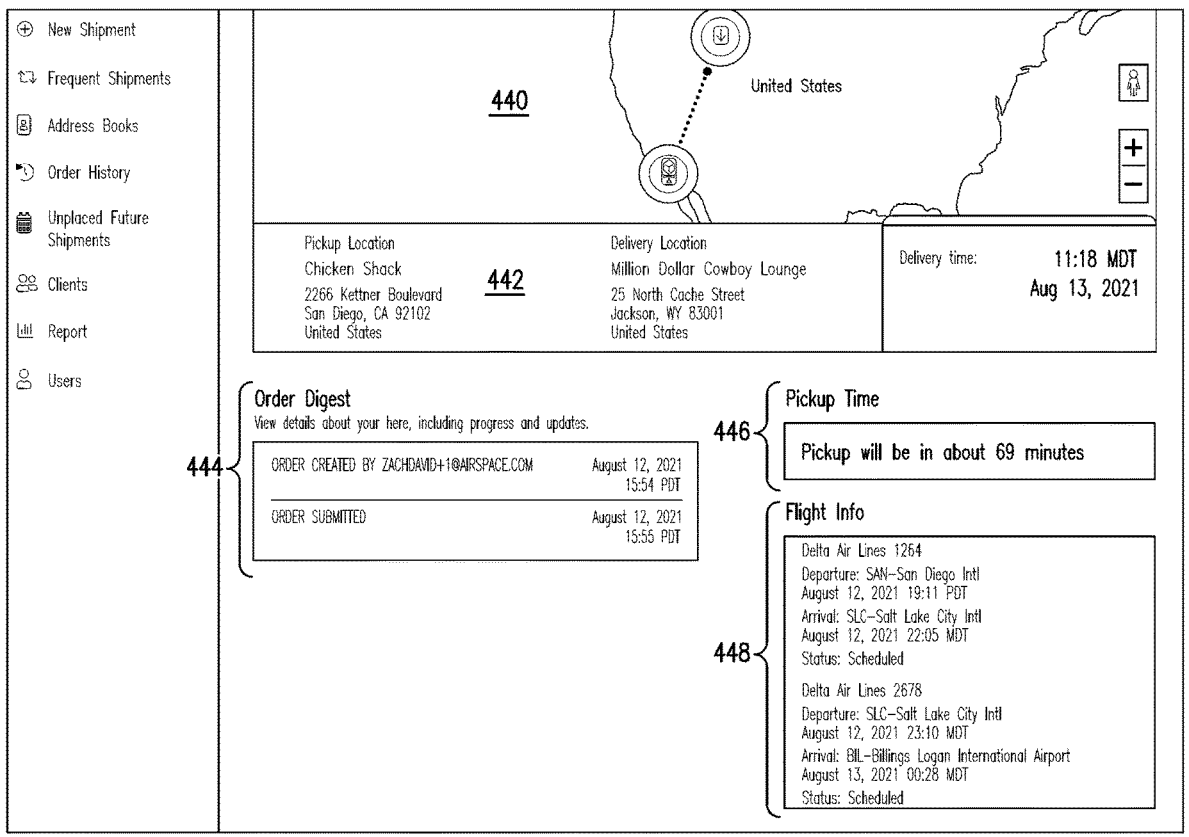
FIG. 10 is an example user interface for showing a summary and status of the electronic user request.

FIG. 10 illustrates an exemplary user interface 400 showing a summary of the electronic user request, including map 440, pickup address and delivery address summary 442, order timeline 444, estimated pickup time 446, and transportation mode summary 448.

Unique Identifiers

Each good to be transported may include one or more unique identifiers (e.g., unique identifier 425). For example, the good may include N unique identifiers, where N is an integer greater than or equal to 1. In some embodiments, the good includes at least 1 unique identifier (e.g., at least 2 unique identifiers, at least 3 unique identifiers, or at least 4 unique identifiers).

Unique identifier 425 can be anything correlated with the good that can be used to identify the specific good. For example the one or more unique identifiers 425 may be a label, a word, a number, alphanumeric text, a barcode, a QR code, or a description of the package, or any combination thereof. In some embodiments, the one or more unique identifiers 425 includes a label comprising descriptive information, such as a name, address, or tracking number. In some embodiments, the one or more unique identifiers 425 includes a word comprising a name. In some embodiments, the one or more unique identifiers 425 includes a number comprising a phone number, identification number, or parcel number. In some embodiments, the one or more unique identifiers 425 includes a barcode or a QR code. In some embodiments, the one or more unique identifiers 425 includes a description of the good (e.g., a color, size, or shape of the good). In some embodiments, the one or more unique identifiers 425 includes an identification number assigned by United Network for Organ Sharing ("UNOS"). In some embodiments, the one or more unique identifiers 425 are provided on user interface 400 in a free text box such that the user may include any combination of text and numbers as the unique identifier 425.

Figure 11:
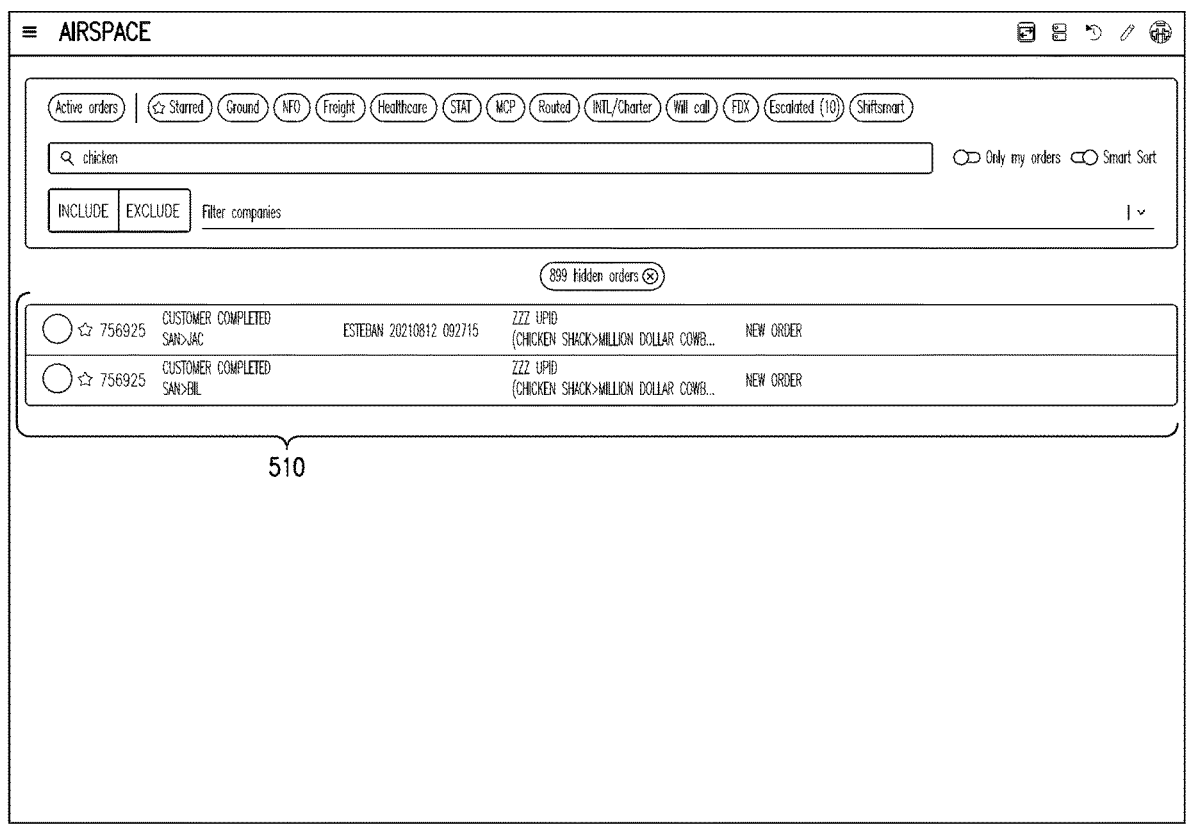
FIG. 11 is an example user interface for showing the status of a user transporting the good.

After a user generates the electronic user request, the electronic user request may be transmitted to central server 102 over the Internet, for example. Authorization system 104 may receive the electronic user request from central server 102. Authorization system 104 may include one or more client devices (e.g., first client device) that receives the electronic user request. FIG. 11 illustrates an exemplary user interface 500 associated with authorization system 104 that includes electronic user request summary 510. In some embodiments, electronic user request summary 510 includes a summary of all outstanding electronic user requests. For example, the exemplary screenshot shown in FIG. 11 illustrates two outstanding user requests (e.g., first electronic user request 511 and second electronic user request 512).

Figure 12:
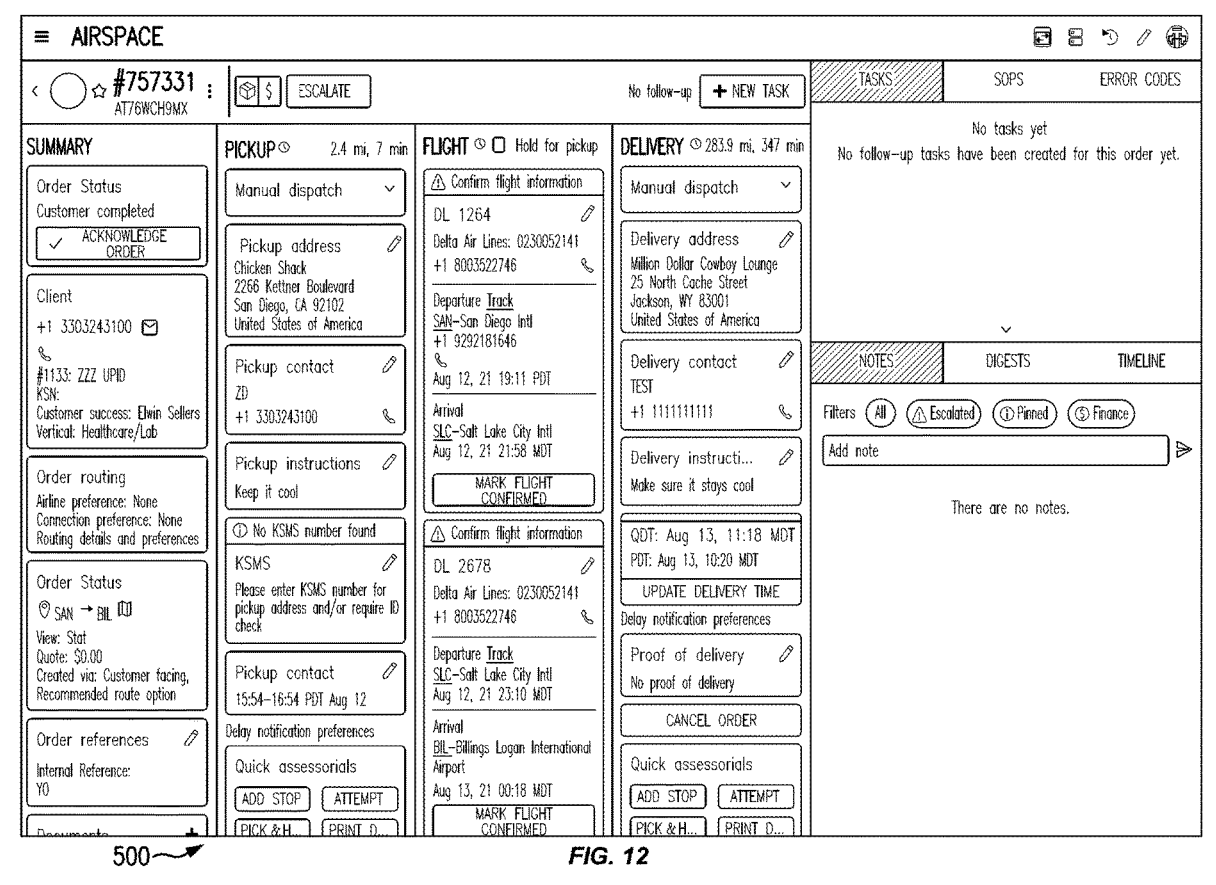
Figure 13:
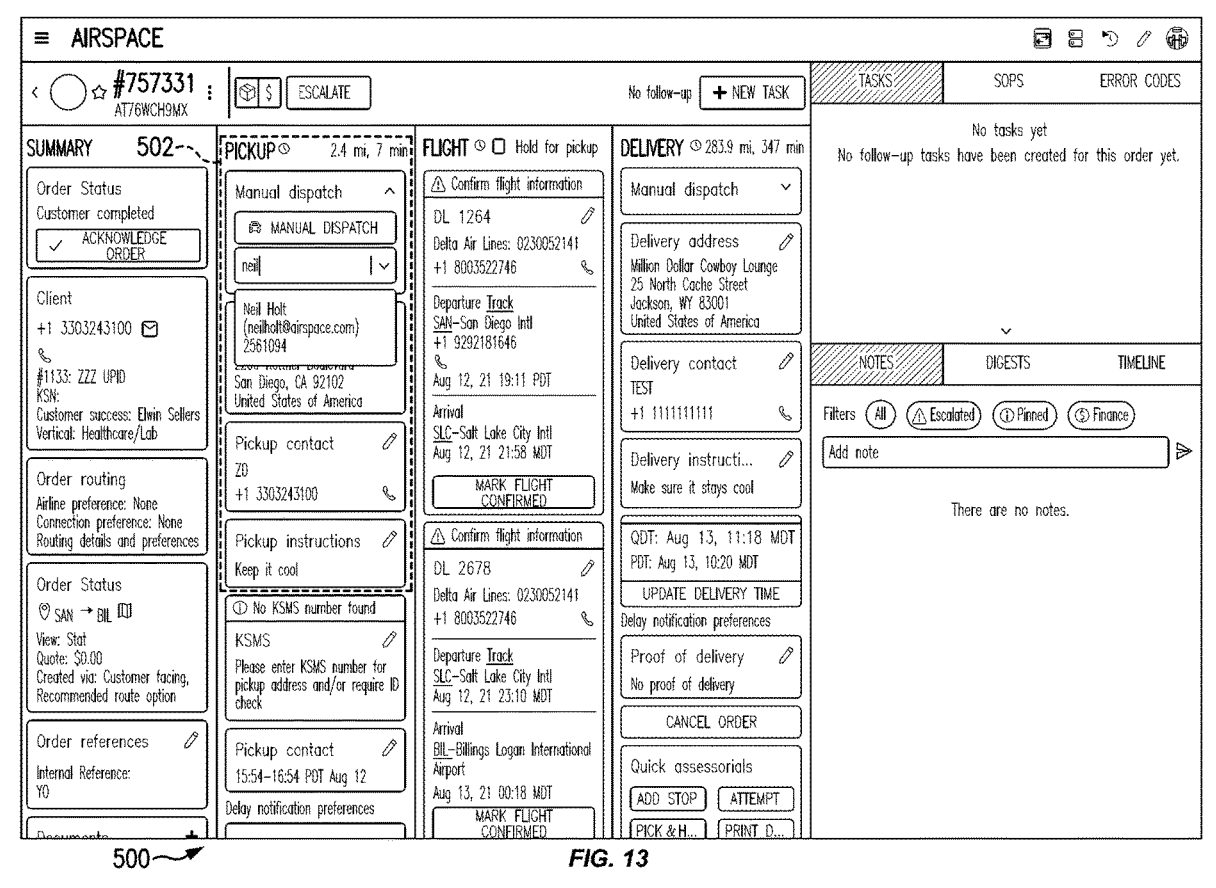
Figure 14:
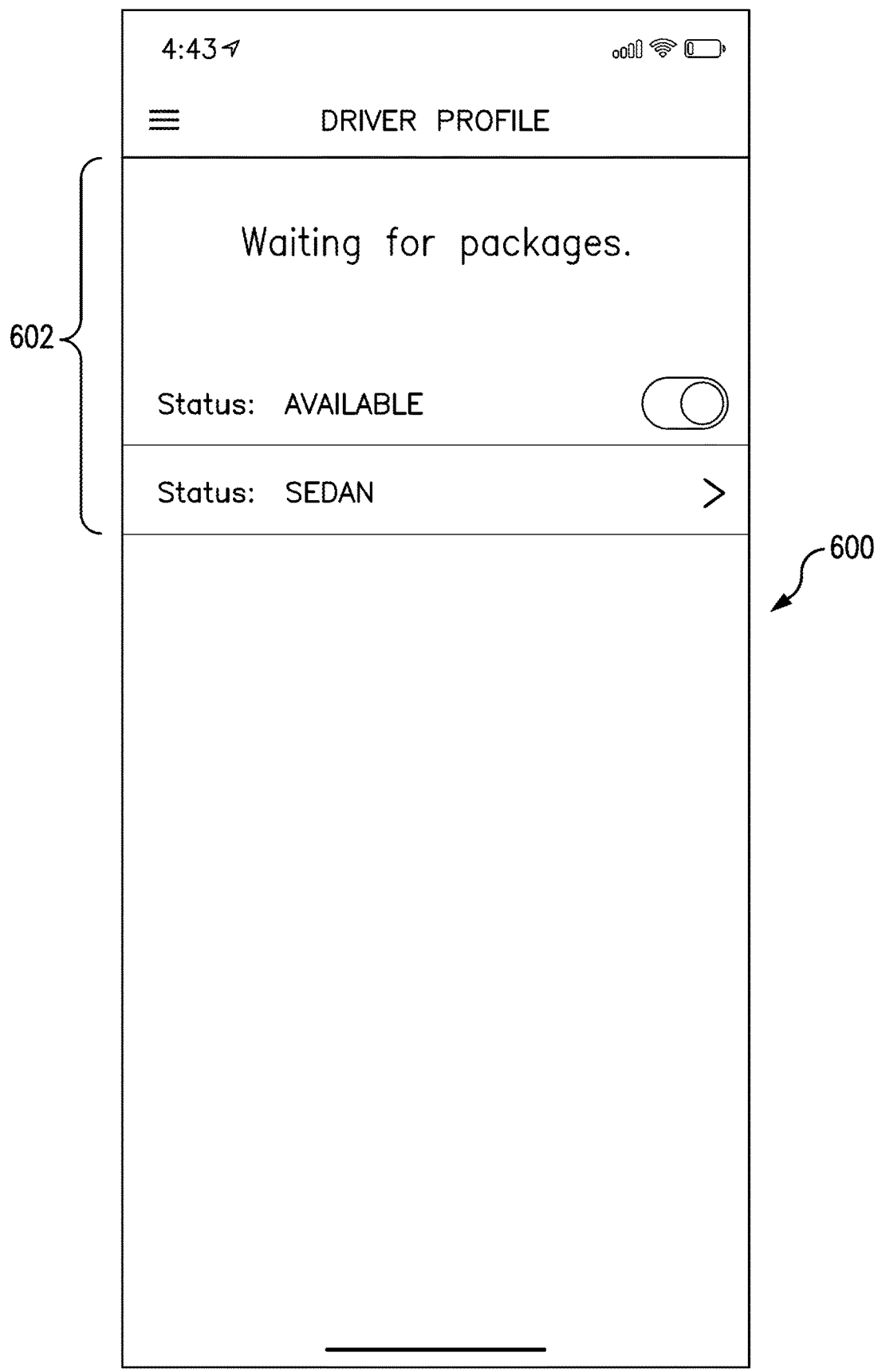
FIGS. 14-23 are example user interfaces for a transport provider.

After receipt of an electronic user request, the authorization system may assign the electronic user request to transport provider 106. FIG. 12 illustrates an exemplary user interface 500 of second electronic user request 512 on authorization system 104 (e.g., on a first client device). User interface 500 may be used to assign one or more electronic user requests to one or more transport providers 106. FIG. 13 illustrates an exemplary user interface 500 for manually assigning an electronic user request to transport provider 106. For example, pickup assignment 502 may include a menu for selecting a transport provider. In some embodiments, authorization system 104 manually assigns the electronic user request to transport provider 106 using pickup assignment 502. In embodiments using the manual assignment, transport provider 106 may be selected from an address book or manually input. FIG. 14 illustrates a user interface 600 on a device (e.g., second client device) of transport provider 106. In some embodiments, authorization system 104 automatically (e.g., without requiring a user input) assigns the electronic user request to transport provider 106. In embodiments using the automatic assignment, transport provider 106 may be selected based on various factors (e.g., transport provider availability, geographic location, vehicle type, cost, timing, etc.). In some embodiments, authorization system 104 assigns the electronic user request based on availability of transport provider 106. For example, as discussed in more detail below related to FIG. 14, a transport provider may set their status to "available" and may provide an indication of the type of vehicle that is available, and an electronic user request may be assigned to that transport provider only when the transport provider has an available status and/or only when that transport provider has a vehicle appropriate for transporting the good.

After assigning the electronic user request, transport provider 106 may travel to the location where the good is located and capture images of the good for authentication and validation as described in more detail below. Authorization system 104 may be used to authenticate and authorize the good for transport based on the captured images, as discussed in more detail below.

FIGS. 14-23 and 28 illustrate the user interface 600 on a device of transport provider 106 (e.g., second client device).

FIG. 14 shows an exemplary transport provider status interface 602 of user interface 600. Transport provider status interface 602 may include options for setting a transport provider's status and what type of vehicle the transport provider uses. In some embodiments, the transport provider may be able to toggle between an available status and an unavailable status. In some embodiments, the transport provider may be able to select vehicle type (e.g., sedan, van, pickup truck, box truck, semi-trailer, etc.). Information about the transport provider status and vehicle type may be transmitted to central server 102 such that authorization system 104 may filter for transport providers meeting availability and vehicle type requirements.

Figure 15:
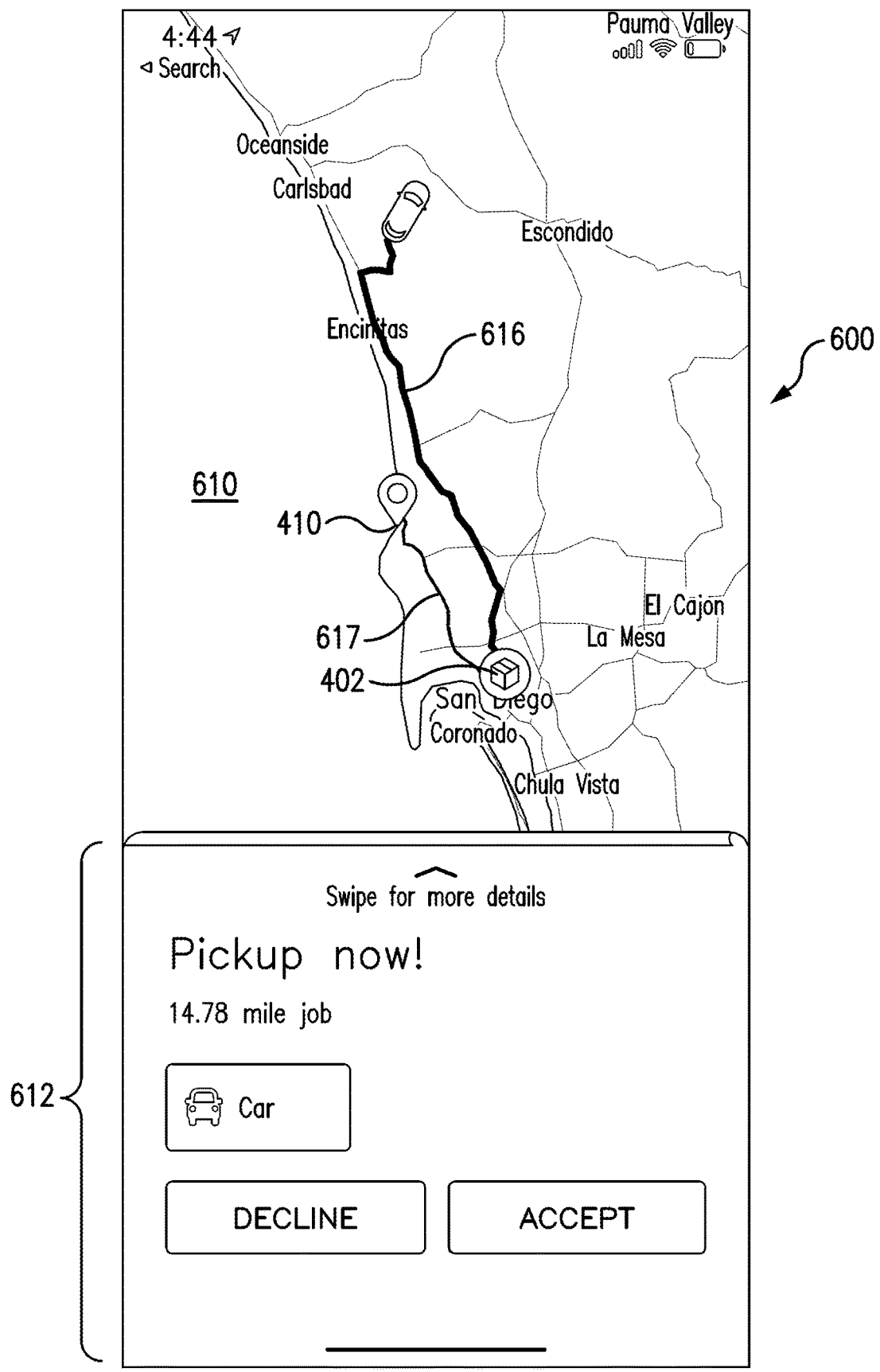

After authorization system 104 assigns an electronic user request to transport provider 106, transport provider 106 may be prompted to accept or decline the assignment, as illustrated in FIG. 15. FIG. 15 illustrates user interface 600 showing route map 610 and assignment options 612. Route map 610 may show route 616 from the transport provider's current location 614 to pickup address 402 and route 617 from the pickup address 402 to delivery address 410. Assignment options 612 may include an option to accept or decline the assignment. If transport provider 106 declines the assignment, authorization system 104 may be notified, and authorization system 104 may re-assign the electronic user request to another transport provider. Re-assignment may be completed using the same assignment methods (e.g., manual or automatic) described above.

Figure 16:
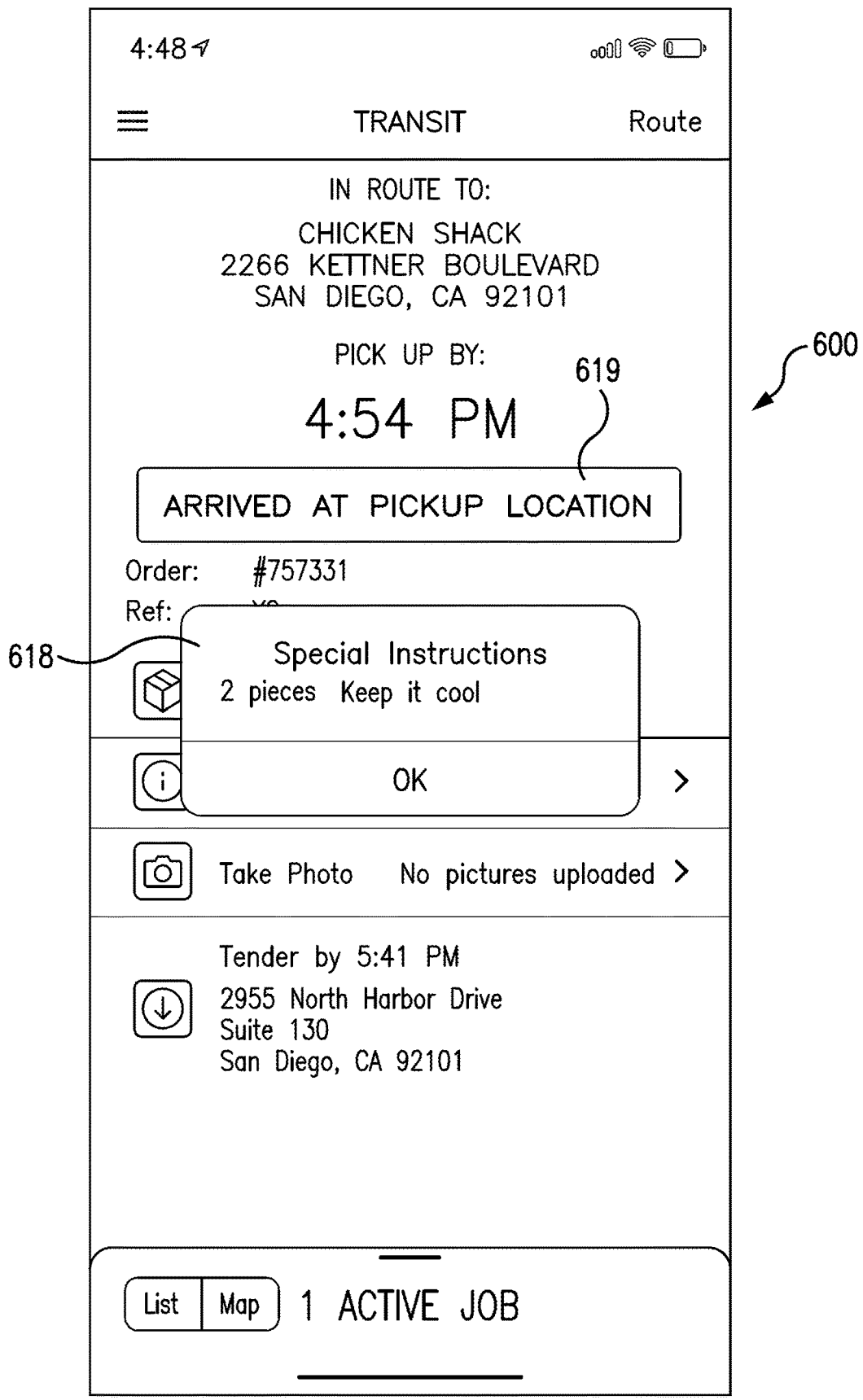

If transport provider 106 accepts the assignment, transport provider 106 may proceed with picking up the good at pickup address 402, requesting authentication of the good, requesting authorization for transport, and transporting the good to delivery address 410. FIGS. 16-23 and 28 illustrate user interface 600 as transport provider 106 proceeds through the various steps to transport the good. FIG. 16 illustrates user interface 600 after transport provider 106 accepts the assignment and/or is in route to pickup address 402. In some embodiments, transport provider 106 receives notification 618 providing pickup special instructions 406. In some embodiments, the transport provider must acknowledge pickup special instructions 406 to dismiss user notification 618. In some embodiments, transport provider 106 is provided the exact pickup location only after accepting the assignment and acknowledging pickup special instructions 406. User interface 600 may include an input option 619 for the transport provider to indicate that they have arrived at pickup address 402.

Figure 17:
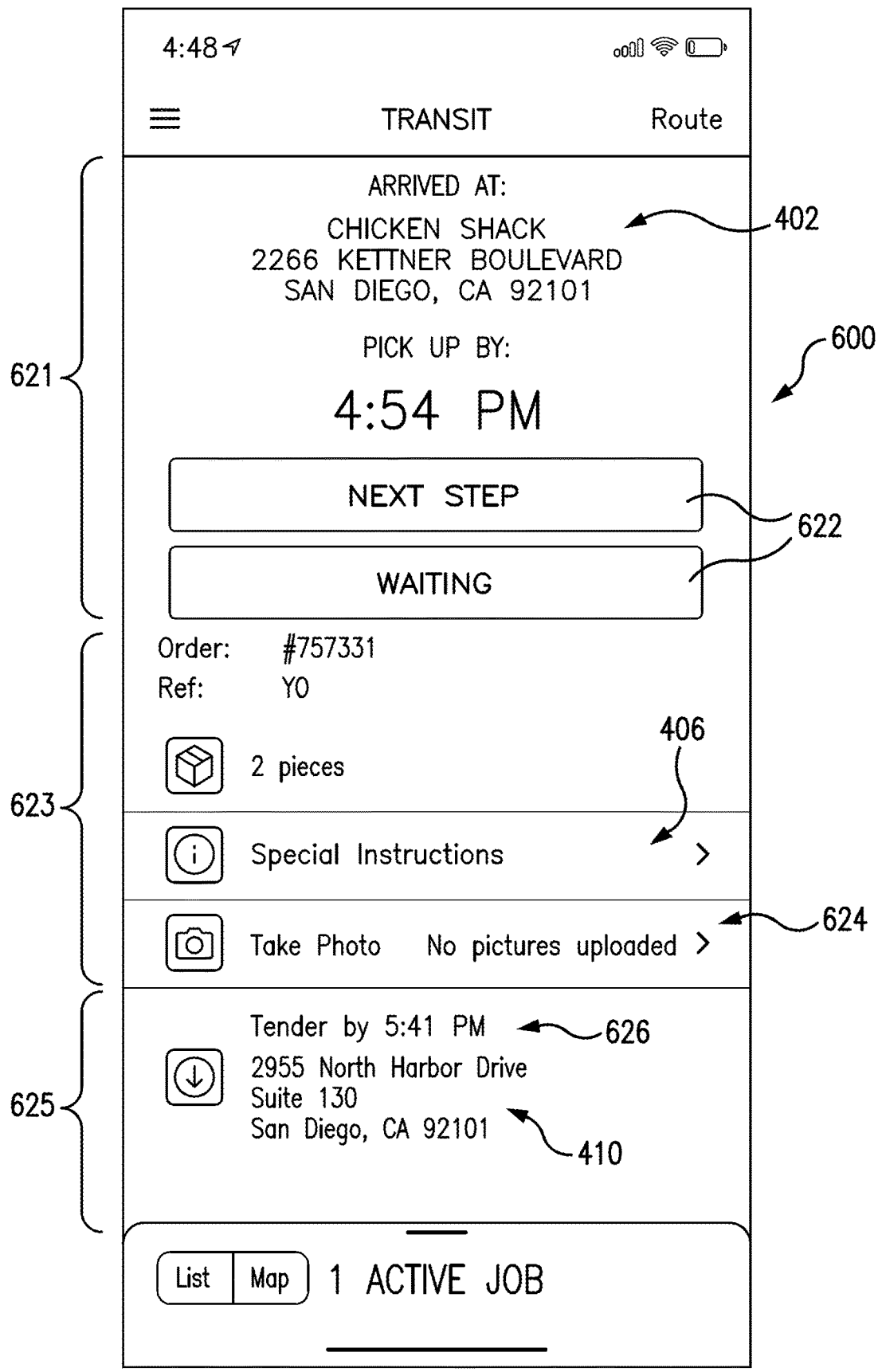

FIG. 17 illustrates user interface 600 after arrival at pickup address 402. User interface 600 may show the transport provider pickup instructions 621, authorization options 622, and delivery address instructions 626. In some embodiments, pickup instructions 621 may include pickup address 402 and a pickup time deadline. In some embodiments, the pickup time deadline is determined by central server 102 based on the travel time from pickup address 402 to delivery address 410. Authorization options 621 may include response options 622, good summary 623, special instructions 406, and photo options 624. Response options 622 may include an option to select "waiting" to indicate that the transport provider is at pickup address 402 but is waiting to authenticate and authorize the good. Response options 622 may include an option to proceed to the next steps of authenticating and authorizing the good for transport. Authenticating and authorizing the good are described in more detail below. Good summary 623 may provide an indication of the number of pieces or goods for pickup (e.g., two pieces as illustrated in FIG. 17). Delivery address instructions 625 may include delivery address 410 and a drop off time deadline 626. In some embodiments, the drop off time is determined by central server 102 based on further transport requirements (e.g., departure time of a further transport provider) or based on user input (e.g., required drop off time). For example, after drop off at delivery address 410, the good may be transported to another destination using a different mode of transportation (e.g., flight, train, commercial delivery provider, etc.) by a different transport provider, and the drop off time is based on the schedules of the different mode of transportation.

Figure 18:
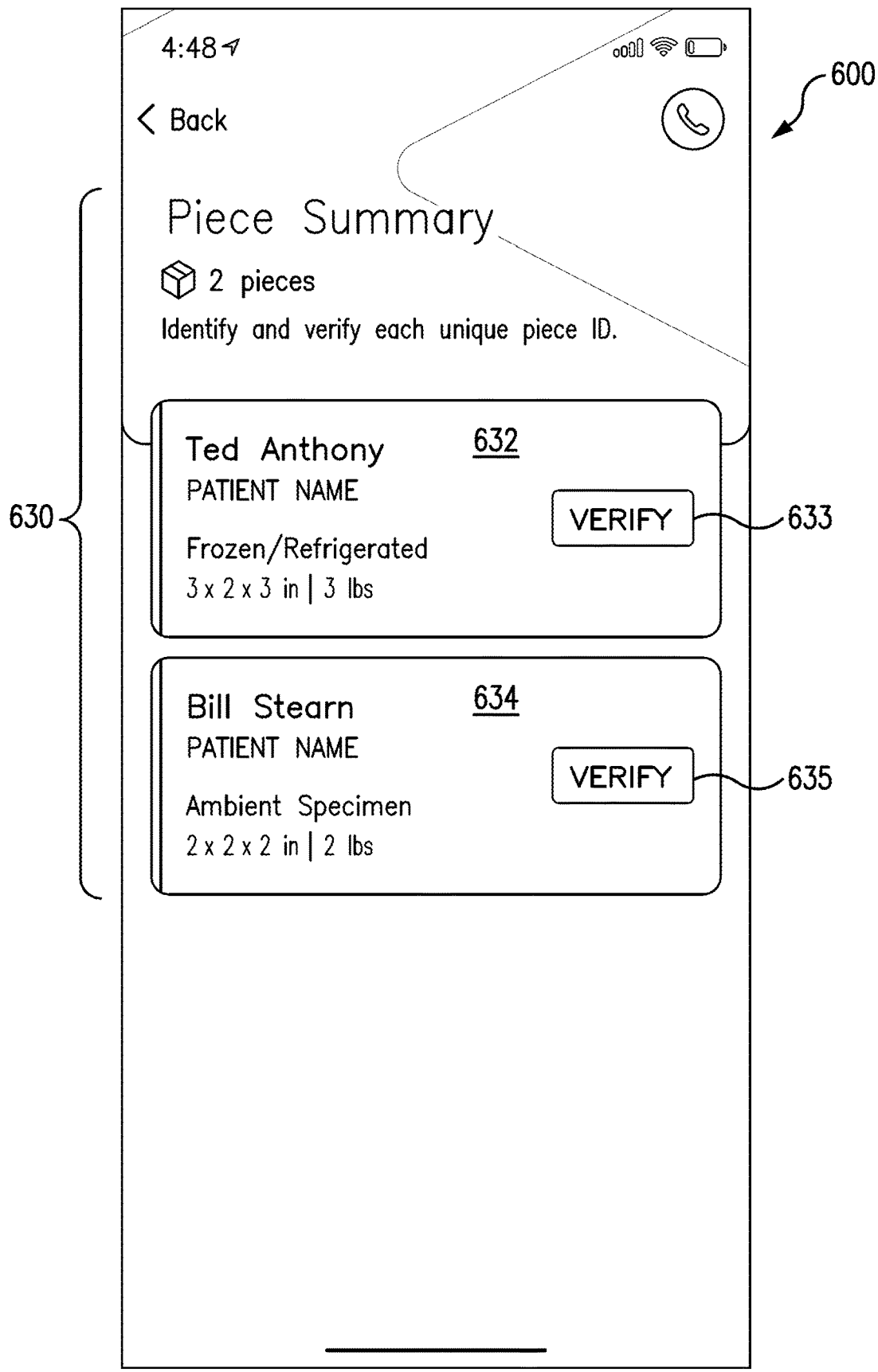

FIG. 18 illustrates user interface 600 showing good summary 630. For each good shown in good detail 630, user interface 600 may include a description of the good, which may include a unique identifier, and an option to verify (i.e., authenticate) each good. For example, user interface 600 shown in FIG. 18 illustrates first good summary 632, first good authentication option 633, second good summary 634, and second good authentication option 635.

Figure 19:
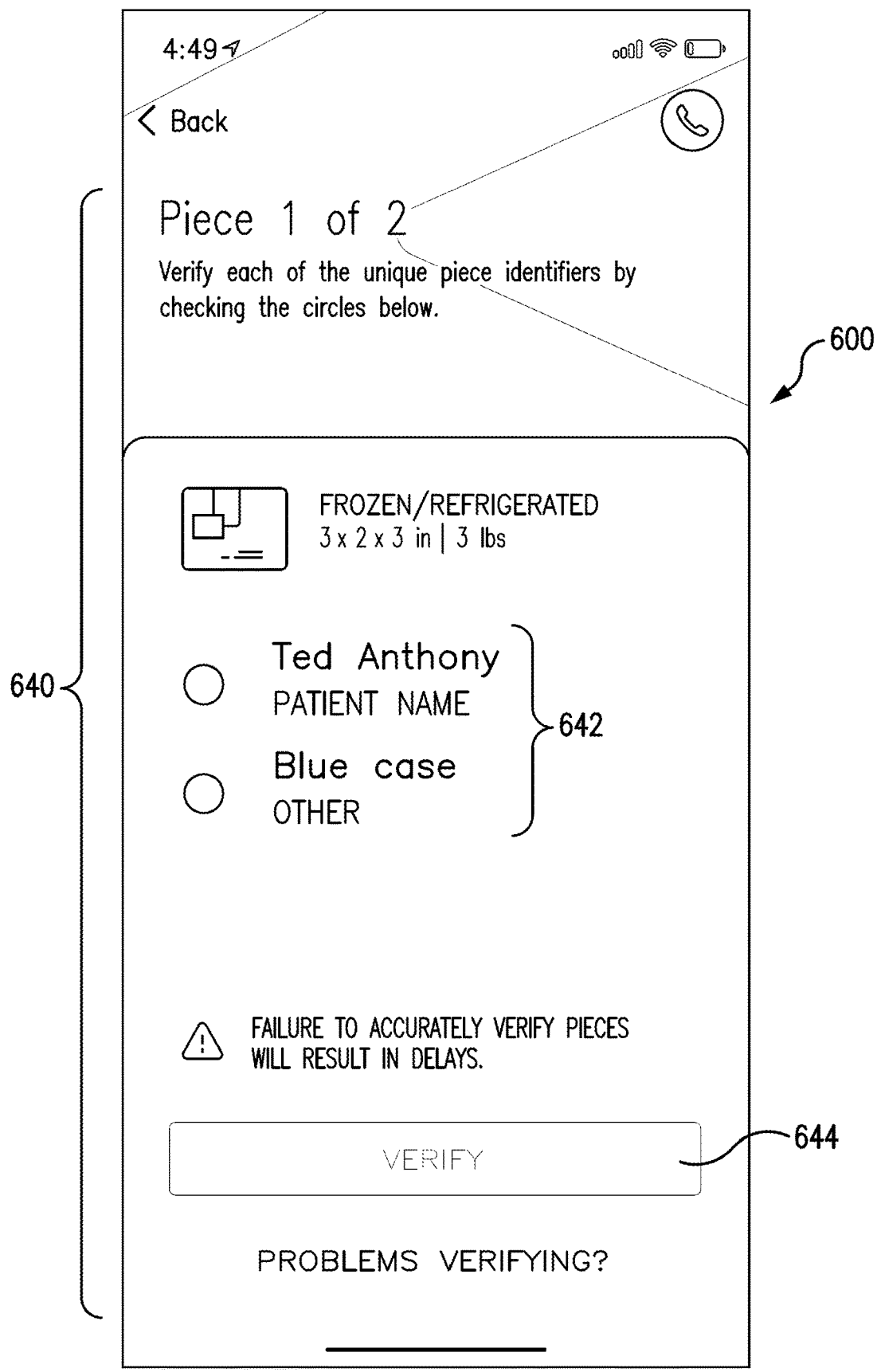
Figure 20:
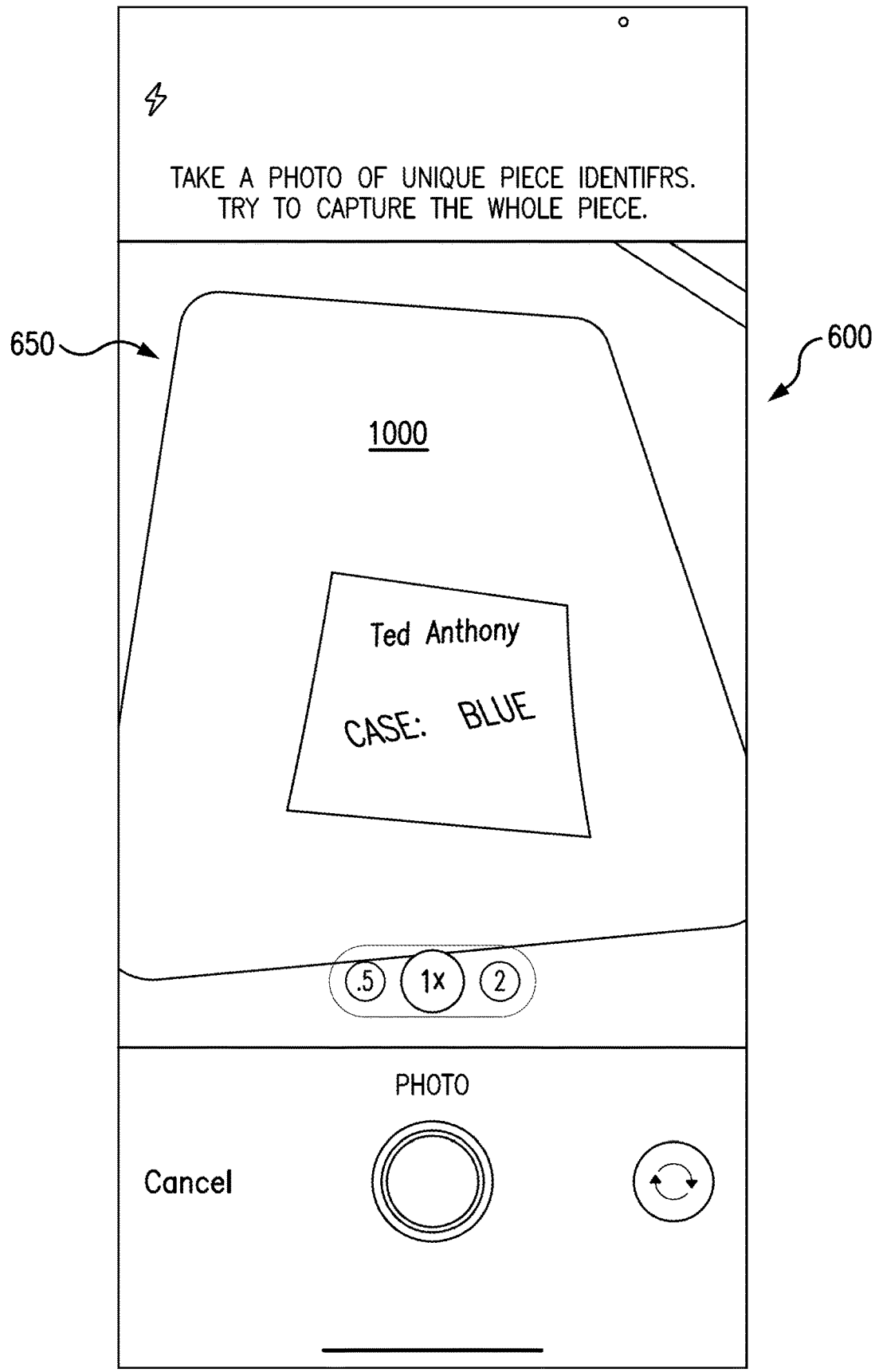

FIG. 19 illustrates user interface 600 for authenticating the good using good detail page 640. Good detail page 640 may include one or more unique identifiers 642 and verification option 644. Each of the unique identifiers 642 may include a radio button that, when selected, allows the transport provider to select verification option 644. Once the transport provider selects the verification option, the user interface 600 opens image capture menu 650, as shown in FIG. 20, that allows the transport provider to capture an image of the good (e.g., good 1000). An image of the good may be captured using a digital camera of transport provider 106 (e.g., a digital camera of the second client device).

Figure 21:
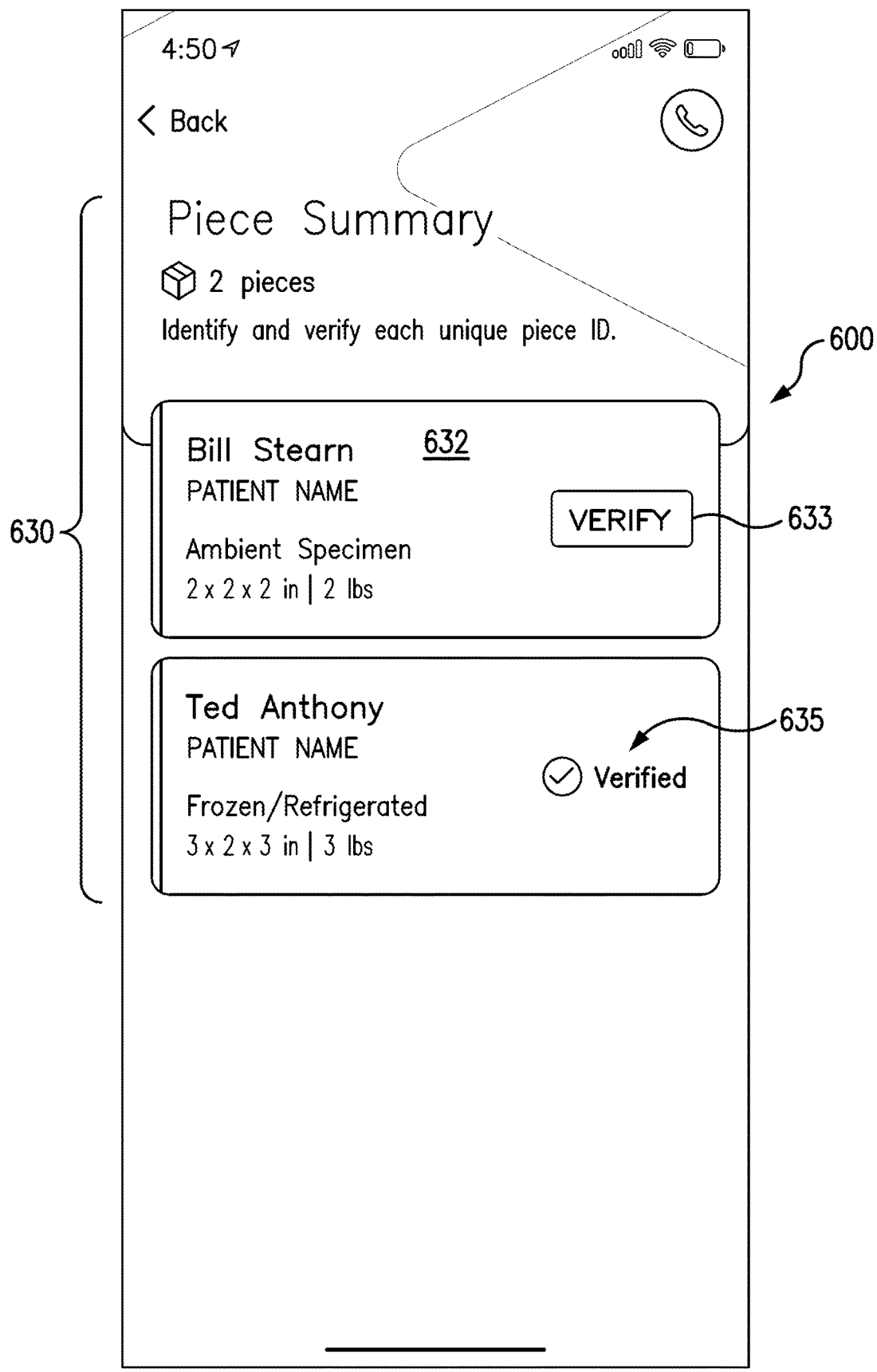

After transport provider 106 captures an image of the good, user interface 600 may show good summary 630. As illustrated in FIG. 21, after an image is captured corresponding to a good, second good authentication option 635 is replaced with an indication that the good is verified.

Figure 22:
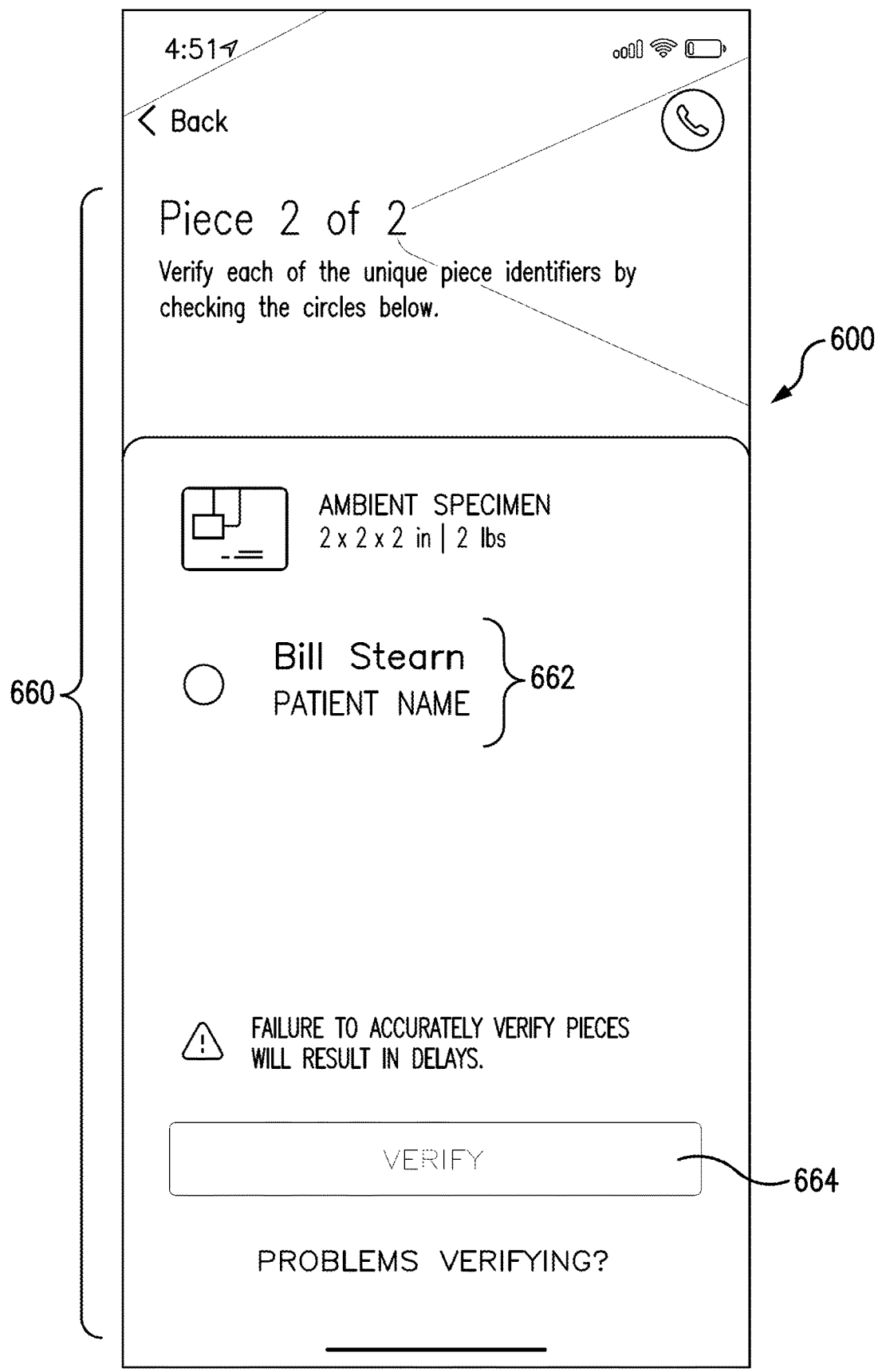

FIG. 22 illustrates user interface 600 for authenticating another good after a first good has been photographed. FIG. 22 illustrates user interface 600 for authenticating another good using good detail page 660. Good detail page 660 may include one or more unique identifiers 662 and verification option 664. Each of the unique identifiers may include a radio button that, when selected, allows the transport provider to select verification option 664. Transport provider 106 may verify subsequent goods using the same steps shown in FIGS. 19-22.

Figure 23:
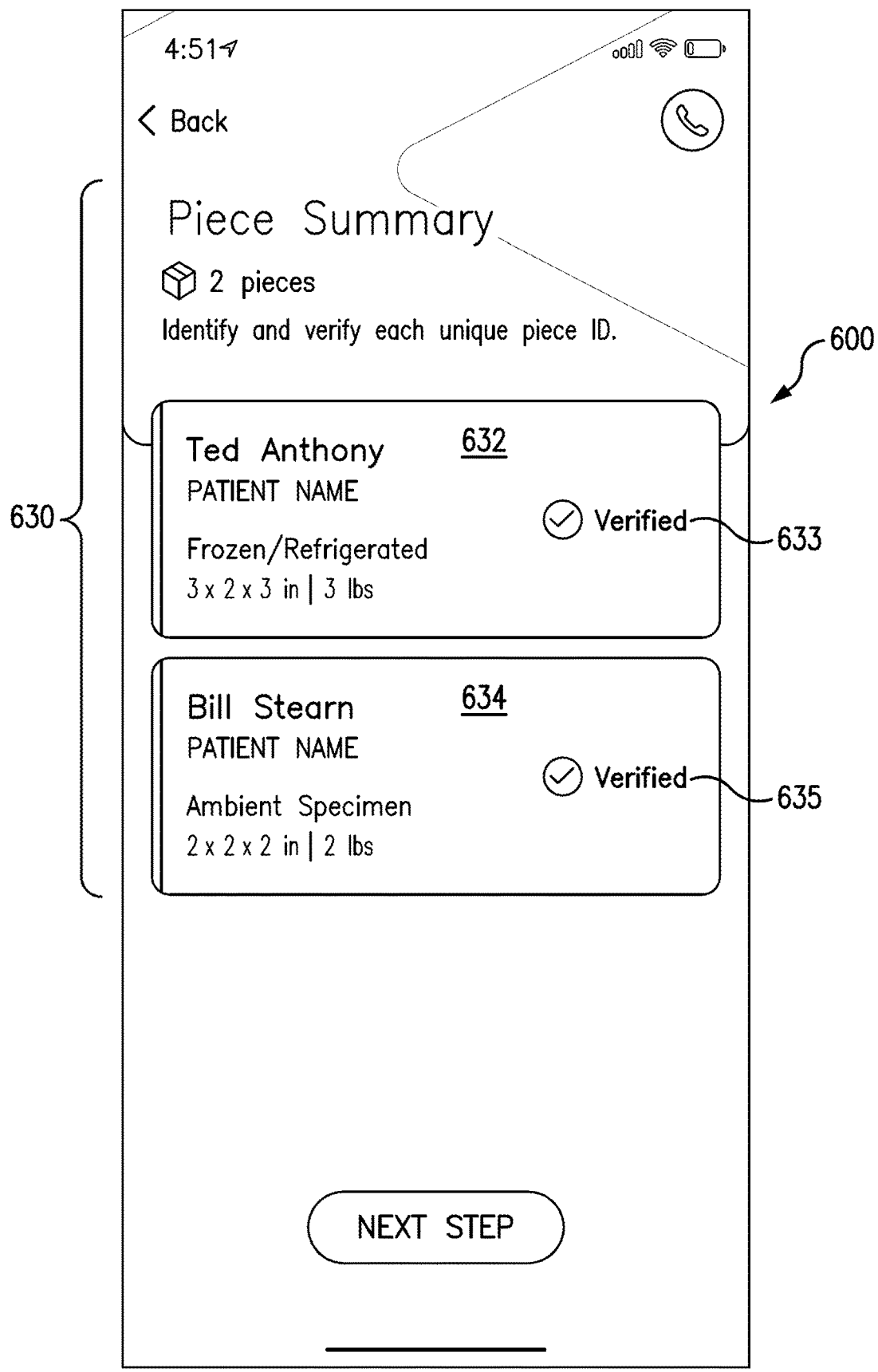

FIG. 23 illustrates user interface 600 after the transport provider photographs all goods. For example, after the transport provider photographs all goods, good summary 630 may indicate each good is "verified." However, before the transport provider is allowed to transport the goods, each good may be authenticated as described below. After authentication, each good may be authorized for transport as described below.

Authentication

After the transport provider captures images of the goods (e.g., as illustrated in FIGS. 17-23) the goods may be authenticated to confirm that the goods photographed by transport provider 106 correspond to the goods in the electronic user request. Authentication may be done using authorization system 104, which may comprise one or more client devices (e.g., first client device). FIGS. 24-27 illustrate authentication of the good.

Figure 24:
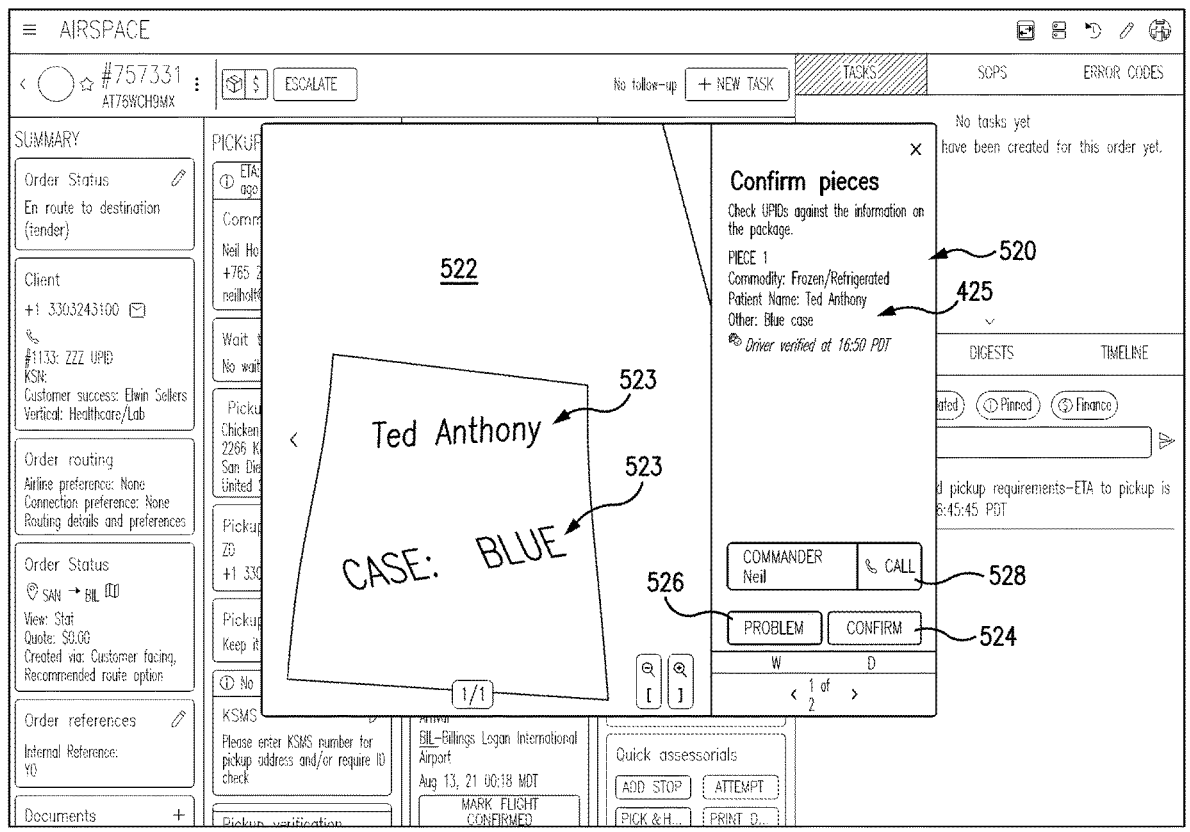

After transport provider 106 captures an image of the good, authorization system 104 may receive image 522 of the good. FIG. 24 illustrates a menu (e.g., image confirmation page 520) that may include an image 522 of the good, confirmation button 524, rejection button 526, contact option 528, and a list of unique identifiers 425. In some embodiments, the image of the good is authorized on the same device that assigns the electronic user request to a transport provider. In some embodiments, authorization system 104 includes multiple devices and the image of the good is authorized on a different device than the device (e.g., first client device) that assigns the electronic user request.

In some embodiments, image confirmation page 520 is automatically pushed to automatically to authorization system 104, for example by Web Socket protocol. In some embodiments, the good is authorized by comparing unique identifiers 425 to one or more features 523 visible in the image 522 of the good. In some embodiments, the comparison of the unique identifiers 425 to the features 523 is done by manually scanning image 522. For example, a user of authorization system 104 may compare features 523 of the image 522 to the unique identifiers 425 to determine if the features 523 match the unique identifiers. If the unique identifiers 425 match the features 523, the user may authenticate the good. In some embodiments, the user may authenticate the good by selecting confirmation button 524. If unique identifiers 425 do not match features 523 or if one or more unique identifiers 425 is missing from features 523, the user may reject the good. In some embodiments, the user may reject the good by selecting rejection button 526.

In some embodiments, the comparison of unique identifiers 425 to features 523 is done automatically by authorization system 104. Authorization system 104 may automatically scan image 522 to detect features 523. For example, authorization system 104 may scan image 522 to recognize text (e.g., by optical character recognition), detect color, scan a barcode, or otherwise detect features 523. Authorization system 104 may then automatically compare the detected features 523 to unique identifiers 425. If authorization system 104 detects a match between the detected features 523 and unique identifiers 425, authorization system 104 may automatically authenticate the good. If authorization system 104 detects that unique identifiers 425 do not match features 523 or that one or more unique identifiers 425 is missing from the features 523, authorization system may automatically reject the good. In embodiments using the automatic authentication method, if authorization system 104 determines there is not a match between features 523 or that one or more unique identifiers 425 is missing, authorization system 104 may forward the authentication request to a user who may manually review image 522 and make a determination of whether the good should be authenticated.

In some embodiments, authorization system 104 will reject the good if any of the unique identifiers 425 do not match features 523 or if any of the unique identifiers are missing from features 523. In some embodiments, authorization system 104 will authenticate the good if at least a certain number of unique identifiers 425 matches features 523. For example, if the electronic user request includes 4 unique identifiers, the authorization system may authenticate the good if at least 2 of the unique identifiers match features 523. In some embodiments, the authorization system authenticates the good if at least 50% (e.g., at least 75% or at least 90%) of the unique identifiers match features 523. In some embodiments, if the electronic request includes 2 unique identifiers, the authorization system will authenticate the good only if both unique identifiers match features 523. In some embodiments, if the electronic request includes 3 or more unique identifiers, the authorization system will authenticate the good only if at least 50% or more of the unique identifiers match features 523.

Figure 25:
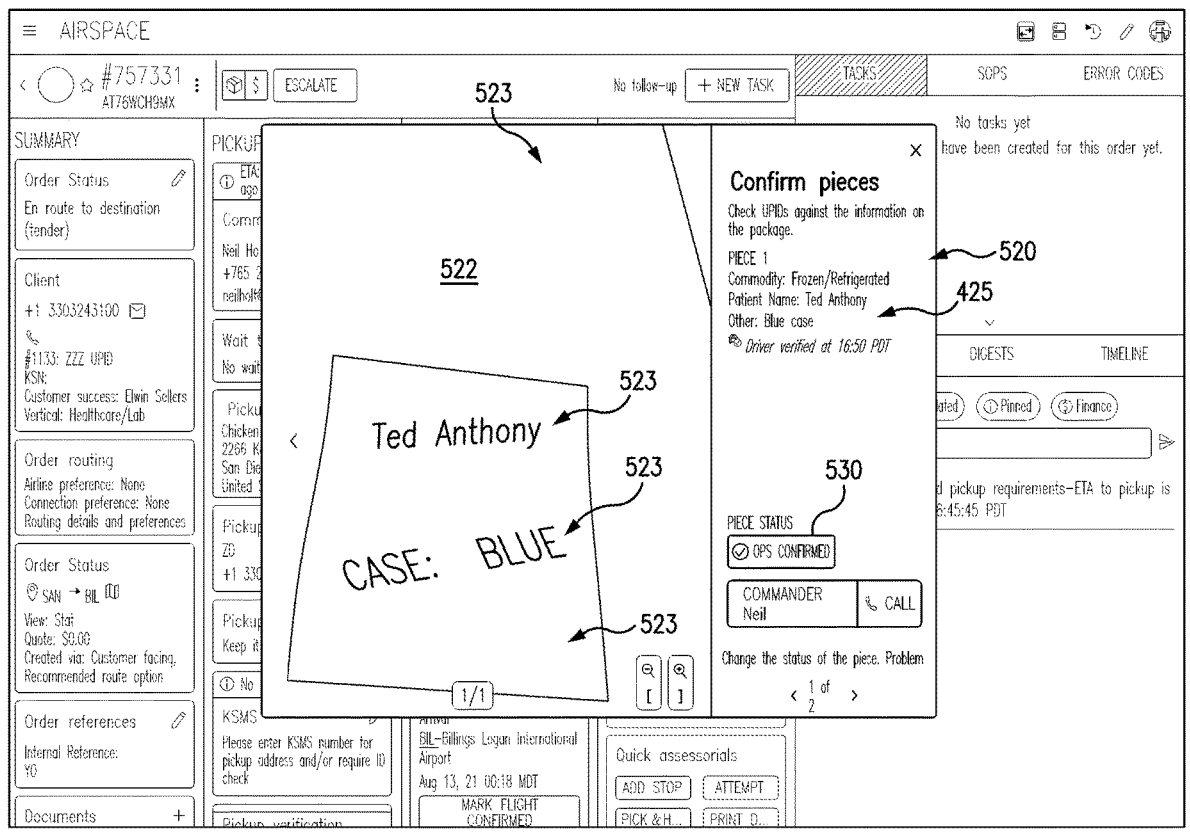

FIG. 25 illustrates image confirmation page 520 after the good has been authenticated either manually or automatically. After authentication, image confirmation page 520 may show good status icon 530 indicating that the good is confirmed or authenticated.

Figure 26:
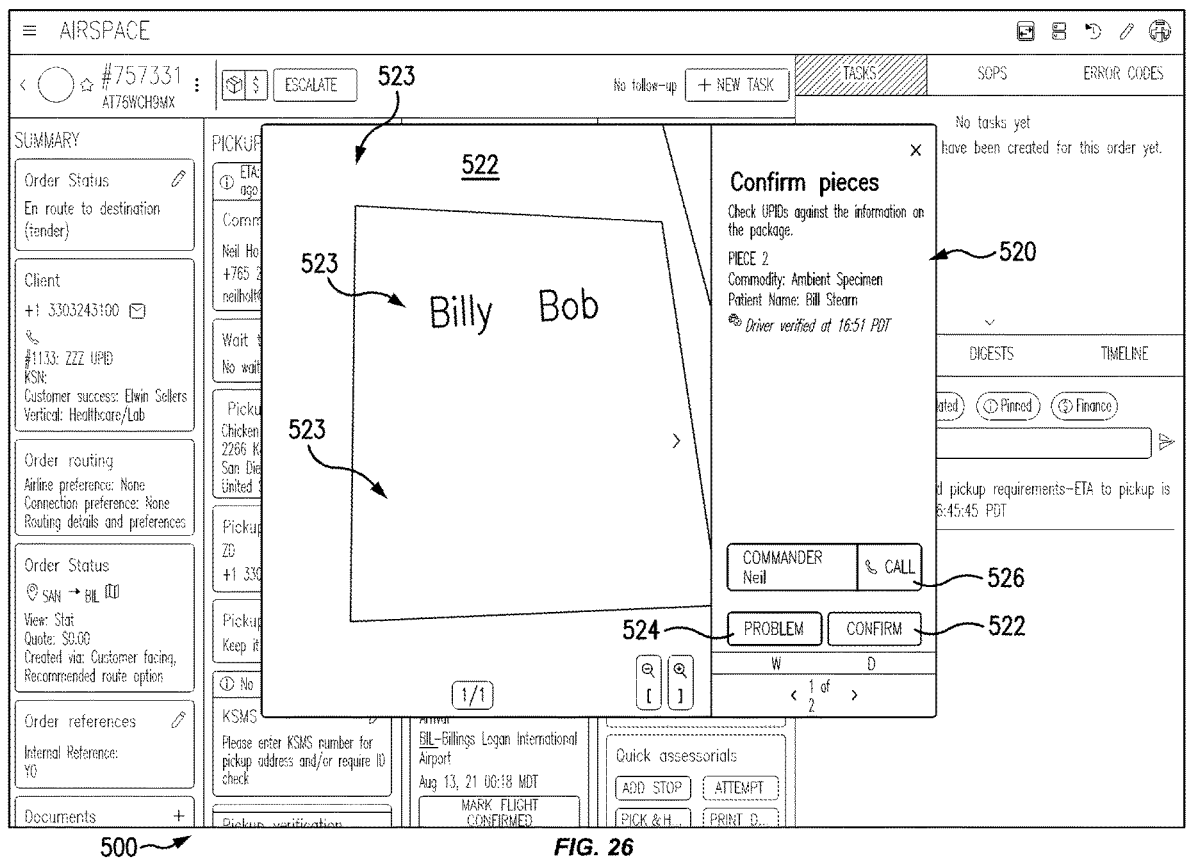
Figure 27:
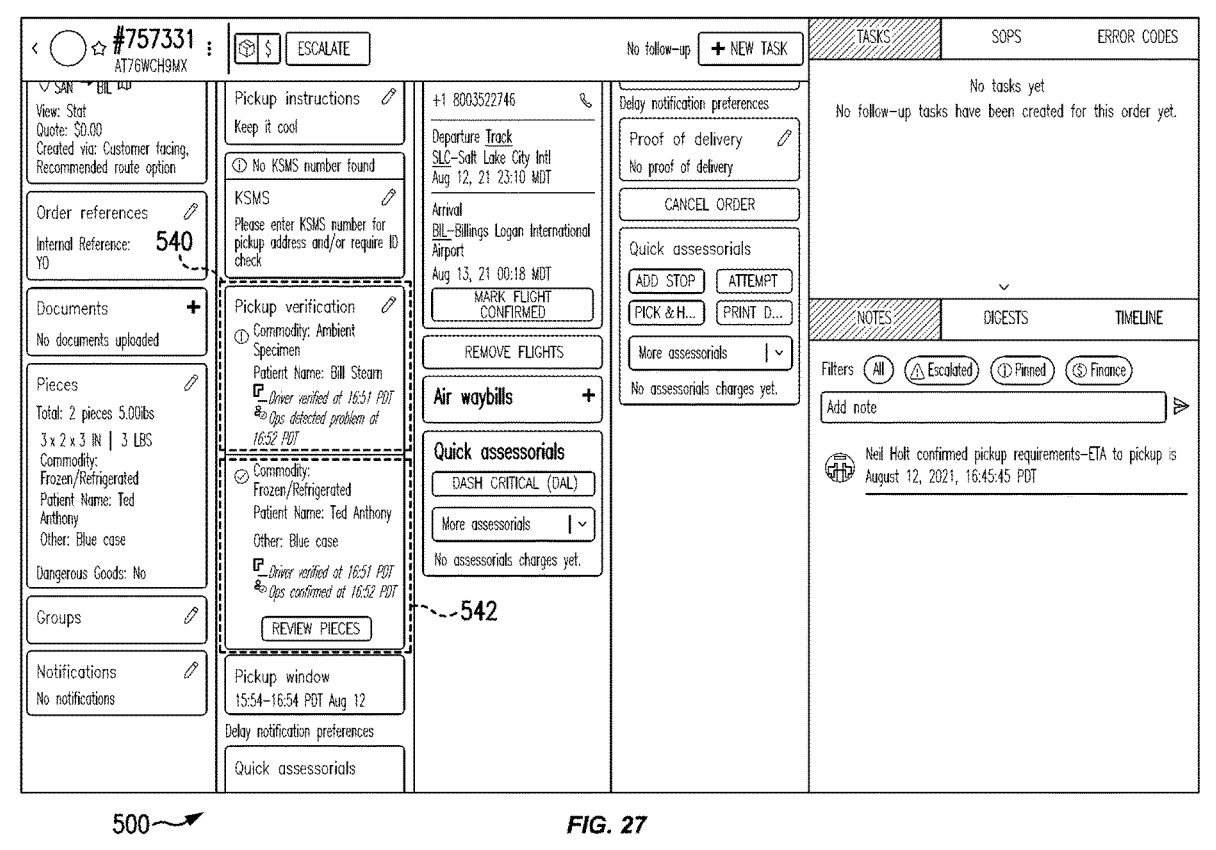
Figure 28:
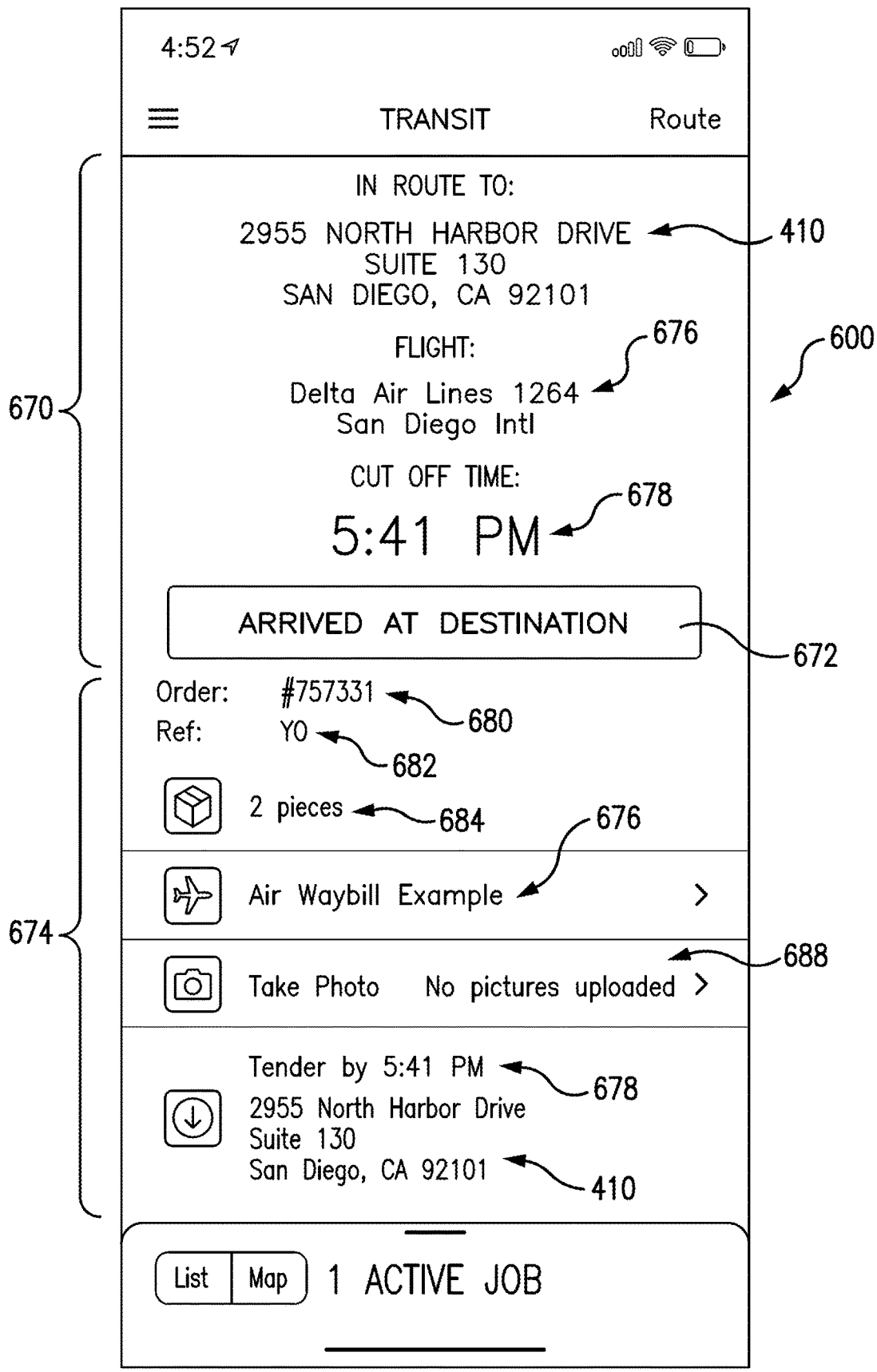
FIG. 28 is an example user interface for a transport provider upon arrival to a destination location.

FIG. 26 illustrates an instance when the image 522 includes features 523 that do not match the unique identifier 425 (e.g., the unique identifier includes "Patient Name Bill Steam" but the name shown in the image is "Billy Bob"). FIG. 27 illustrates user interface 500 showing one rejected good (e.g., at section 540) and one authenticated good (e.g., at section 542).

After rejecting the good, the system may alert transport provider 106 that the good is rejected. In some embodiments, the alert may be in the form of a notification, a text message, a phone call, or some combination of these. In some embodiments, authorization system 104 may automatically call transport provider 106 to alert transport provider 106 that the good is rejected.

In some embodiments, when the authorization system rejects the good, the authorization system will request that transport provider 106 capture additional images of the good. In some embodiments, the request may be in the form of a notification, a text message, a phone call, or some combination of these. In response to the request to capture additional images of the good, the transport provider may capture additional images, and the authorization system may repeat the steps of authenticating or rejecting the images as described above.

Authorization

Authorization system 104 may authorize the good for transport. In some embodiments, authorization system 104 authorizes the good for transport only after authorization system 104 has authenticated the good as described above. After authorizing the good for transport, authorization system 104 may alert the transport provider that the good is authorized for transport. In some embodiments, the alert may be in the form of a notification, a text message, a phone call, or some combination of these. In some embodiments, the alert is provided automatically to the transport provider after authentication.

In some embodiments, authorization system 104 provides the exact delivery address (e.g., delivery address 410) to transport provider 106 after the good has been authenticated and authorized for transport. For example, after authentication and authorization, user interface 600 shown in FIG. 28 may be visible to transport provider 106 (e.g., on the second client device) showing destination information 670. Destination information 670 may include delivery address 410, mode of transportation 676 (e.g., flight, train, commercial delivery provider, etc.), and delivery deadline 678. Destination information 670 may include arrival button 672 that transport provider 106 may select upon arrival. When arrival button 672 is selected, a notification may be provided to authorization system 104 and/or to user device 108 indicating that the good has arrived at the destination location. User interface 600 may further delivery details 674. Delivery details 674 may include further details such as order number 680, reference number 682, number of goods 684, mode of transportation information 676, image capture option 688, delivery address 410, and delivery deadline 678.

In some embodiments, upon arrival at the destination location, transport provider 106 may select image capture option 688 of delivery details 674 to capture images of the good upon dropoff at delivery address 410.

Figure 29:
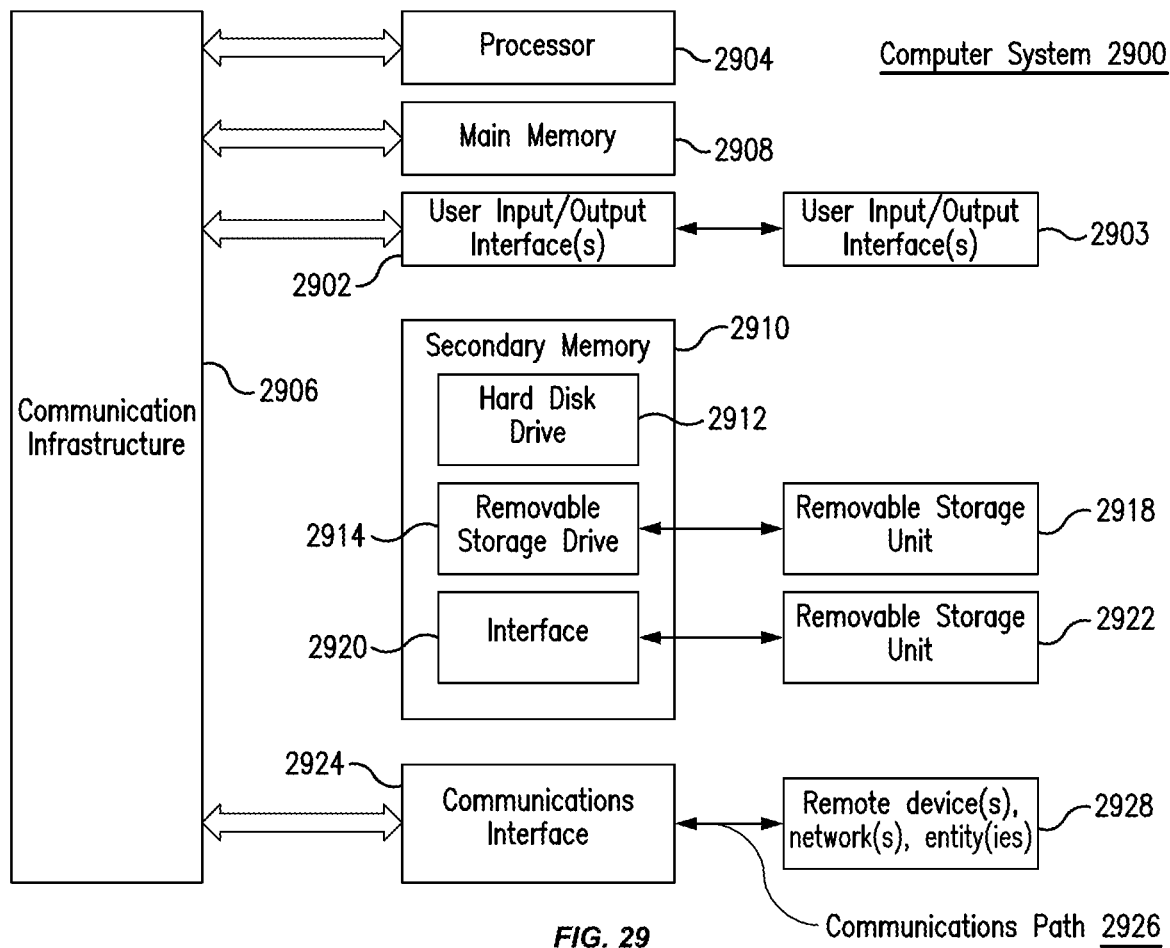
FIG. 29 is an example computer system used with systems and methods according to some embodiments.

Various embodiments may be implemented, for example, using one or more well-known computer systems, such as computer system 2900 shown in FIG. 29. One or more computer systems 2900 may be used, for example, to implement any of the embodiments discussed herein, as well as combinations and sub-combinations thereof.

Computer system 2900 may include one or more processors (also called central processing units, or CPUs), such as a processor 2904. Processor 2904 may be connected to a communication infrastructure or bus 2906.

Computer system 2900 may also include user input/output device(s) 2903, such as monitors, keyboards, pointing devices, etc., which may communicate with communication infrastructure 2906 through user input/output interface(s) 2902.

One or more processors 2904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 2900 may also include a main or primary memory 2908, such as random access memory (RAM). Main memory 2908 may include one or more levels of cache. Main memory 2908 may have stored therein control logic (i.e., computer software) and/or data.

Computer system 2900 may also include one or more secondary storage devices or memory 2910. Secondary memory 2910 may include, for example, a hard disk drive 2912 and/or a removable storage device or drive 2914. Removable storage drive 2914 may be a floppy disk drive, a magnetic tape drive, a compact disk drive, an optical storage device, tape backup device, and/or any other storage device/drive.

Removable storage drive 2914 may interact with a removable storage unit 2918.

Removable storage unit 2918 may include a computer-usable or readable storage device having stored thereon computer software (control logic) and/or data. Removable storage unit 2918 may be a floppy disk, magnetic tape, compact disk, DVD, optical storage disk, and/any other computer data storage device. Removable storage drive 2914 may read from and/or write to removable storage unit 2918.

Secondary memory 2910 may include other means, devices, components, instrumentalities or other approaches for allowing computer programs and/or other instructions and/or data to be accessed by computer system 2900. Such means, devices, components, instrumentalities, or other approaches may include, for example, a removable storage unit 2922 and an interface 2920. Examples of the removable storage unit 2922 and the interface 2920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 2900 may further include a communication or network interface 2924. Communication interface 2924 may enable computer system 2900 to communicate and interact with any combination of external devices, external networks, external entities, etc. (individually and collectively referenced by reference number 2928). For example, communication interface 2924 may allow computer system 2900 to communicate with external or remote devices 2928 over communications path 2926, which may be wired and/or wireless (or a combination thereof), and which may include any combination of LANs, WANs, the Internet, etc. Control logic and/or data may be transmitted to and from computer system 2900 via communication path 2926.

Computer system 2900 may also be any of a Personal Digital Assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

Computer system 2900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), Data Center as a service (DCaaS), software as a service (SaaS), managed software as a service (MSaaS), platform as a service (PaaS), desktop as a service (DaaS), Function as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 2900 may be derived from standards including but not limited to JavaScript Object Notation (JSON), Extensible Markup Language (XML), Yet Another Markup Language (YAML), Extensible HyperText Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 2900, main memory 2908, secondary memory 2910, and removable storage units 2918 and 2922, as well as tangible articles of manufacture embodying any combination of the foregoing. Such control logic, when executed by one or more data processing devices (such as computer system 2900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 29. In particular, embodiments can operate with software, hardware, and/or operating system implementations other than those described herein.

It is to be appreciated that the Detailed Description section, and not any other section, is intended to be used to interpret the claims. Other sections may set forth one or more but not all exemplary embodiments of the present disclosure as contemplated by the inventor(s), and thus, are not intended to limit the present disclosure and the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. Also, alternative embodiments can perform functional blocks, steps, operations, methods, etc., using orderings different than those described herein.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The breadth and scope of the present disclosure should not be limited by any of the above-described exemplary embodiments, but should be defined only in accordance with the following claims and their equivalents.

What is claimed is:

1. A computer implemented method for transporting of a good, comprising:
   receiving, on a first client device, an electronic user request for transporting the good from a pickup location to a destination location, the electronic user request being generated by a first user and comprising:
      a unique identifier corresponding to the good, the unique identifier comprising a number sequence, an alphanumeric sequence, a barcode, or a QR code;
   assigning the electronic user request to a remote user of a second client device, the second client device comprising a digital camera configured to capture one or more images of the good, the assigning comprising transmitting the electronic user request to the second client device;
   receiving, on the first client device, an electronic image of the good captured by the digital camera of the second client device;
   authenticating the good, the authentication comprising:
      performing a scan of the electronic image to identify features of the good;
      comparing the unique identifier to the identified features of the good;
      authenticating the good when the unique identifier matches a first feature of the identified features of the good;
   authorizing the good for transporting when the good is authenticated; and
   rejecting the good for transporting when the good is not authenticated.

2. The method of claim 1, wherein the authorizing the good comprises sending an electronic transmission indicating approval of the image, and wherein the rejecting the good comprises sending an electronic transmission indicating rejection of the image comprises an error notification.

3. The method of claim 1, further comprising encrypting the electronic user request before transmitting the electronic user request to the second client device.

4. The method of claim 1, wherein the electronic user request comprises a second unique identifier.

5. The method of claim 4, wherein the authenticating the good further comprises:
   comparing the second unique identifier to the identified features of the good; and
   authenticating the good when the second unique identifier matches a second feature of the identified features of the good, the second feature being different than the first feature.

6. The method of claim 4, wherein the second unique identifier comprises one or more of a number sequence, an alphanumeric sequence, a word, a barcode, a QR code, an address, a name, a UNOS number, or a description of the good, and wherein the second unique identifier is different than the unique identifier.

7. The method of claim 6, wherein the second unique identifier comprises one or more of a UNOS number or a name.

8. The method of claim 1, wherein the electronic user request comprises the pickup location and the destination location.

9. The method of claim 1, wherein the authorizing the good further comprises transmitting an approval notification to the remote user when the good is authenticated.

10. The method of claim 1, wherein the rejecting the good further comprises transmitting an error notification to the remote user when the good is not authorized.

11. The method of claim 10, wherein the error notification comprises a phone call, an SMS message, an email, or a push notification.

12. The method of claim 10, wherein the error notification comprises a message to the remote user to capture a replacement electronic image of the unique identifier on the second client device.

13. The method of claim 12, further comprising:
   receiving, on the first client device, the replacement electronic image, and
   wherein the authenticating the good further comprises:
      performing a scan of the replacement electronic image to identify features of the good;
      comparing the unique identifier to the identified features of the good;

authenticating the good when the unique identifier matches a first feature of the identified features of the good;

authorizing the good for transporting when the good is authenticated; and rejecting the good for transporting when the good is not authenticated.

14. The method of claim 1, further comprising receiving a second electronic image of the good.

15. The method of claim 1, wherein the authorizing the good comprises transmitting the destination location to the second client device.

16. The method of claim 1, further comprising generating, on the first client device, a route from the pickup location and the destination location, and wherein the route comprises a first segment from the pickup location to a second location.

17. The method of claim 14, wherein the authorizing the good further comprises transmitting the second location to the second client device.

18. The method of claim 1, wherein the authenticating the good further comprises:

performing optical character recognition on the electronic image to detect text; and generating a comparison based on the detected text and the unique identifier.

19. The method of claim 1, wherein the authenticating the good is done on the first client device.

20. The method of claim 1, wherein the electronic user request comprises N unique identifiers, wherein N is an integer greater than or equal to 1, and wherein the N unique identifiers includes the unique identifier, and wherein the authenticating the good further comprises:

comparing each of the N unique identifiers to the identified features of the good;

authenticating the good when the each of the N unique identifiers matches at least one feature of the identified features of the good; and rejecting the good when any one of the N unique identifiers does not match at least one feature of the identified features of the good.

21. A system, comprising a first client device, the first client device configured to:

receive an electronic user request for transporting of a good from a pickup location to a destination location, the electronic user request comprising:
a unique identifier corresponding to the good;
the pickup location; and
the destination location;

transmit the electronic user request to a second client device of a remote user, the second client device comprising a digital camera;

receive an electronic image of the good captured by the digital camera of the second client device;

authenticate the good based on the electronic image, the authenticating comprises:

performing a scan of the electronic image to identify features of the good;

comparing the unique identifier to the identified features of the good;

authenticating the good when the unique identifier matches a first feature of the identified features of the good;

authorize the good for transporting when the good is authenticated; and reject the good for transporting when the good is not authenticated.

22. The system of claim 21, wherein the second client device is configured to provide directions from a current location of the second client device to the pickup location when the first client device transmits the electronic user request to the second client device.

23. The system of claim 22, wherein the second client device is configured to provide directions from the pickup location to a second location when the first client device authorizes the good for transporting.

24. The system of claim 21, wherein the electronic user request comprises a second unique identifier corresponding to the good.

25. The system of claim 24, wherein the authentication further comprises comparing the second unique identifier to the identified features of the good and authenticating the good when the second unique identifier matches a second feature of the identified features of the good.

26. The system of claim 21, wherein the first client device is further configured to automatically contact the remote user when the good is rejected.

* * * * *